May 2, 1967 H. HELLERMAN 3,317,898

MEMORY SYSTEM

Filed July 19, 1963 19 Sheets-Sheet 1

INVENTOR
HERBERT HELLERMAN
BY Francis J. Thomas
ATTORNEY

May 2, 1967 H. HELLERMAN 3,317,898

MEMORY SYSTEM

Filed July 19, 1963 19 Sheets-Sheet 2

May 2, 1967 H. HELLERMAN 3,317,898

MEMORY SYSTEM

Filed July 19, 1963 19 Sheets-Sheet 4

May 2, 1967

H. HELLERMAN 3,317,898

MEMORY SYSTEM

Filed July 19, 1963

19 Sheets-Sheet 6

May 2, 1967 H. HELLERMAN 3,317,898

MEMORY SYSTEM

Filed July 19, 1963 19 Sheets-Sheet 11

DIRECTORY MEMORY 5

May 2, 1967 H. HELLERMAN 3,317,898
MEMORY SYSTEM
Filed July 19, 1963 19 Sheets-Sheet 14
ASSOCIATIVE MEMORY FIG. 4b
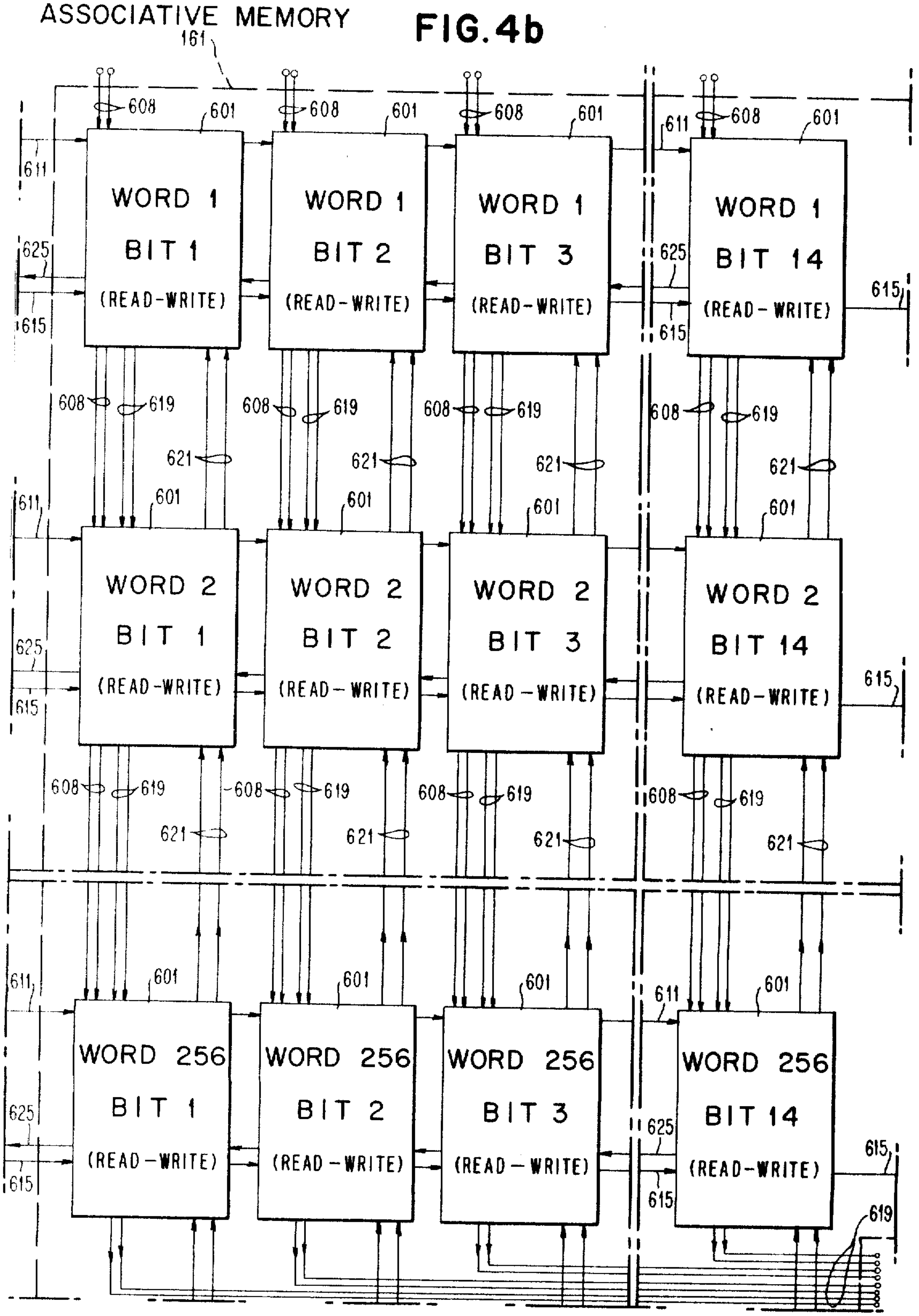

ASSOCIATIVE MEMORY FIG.4c
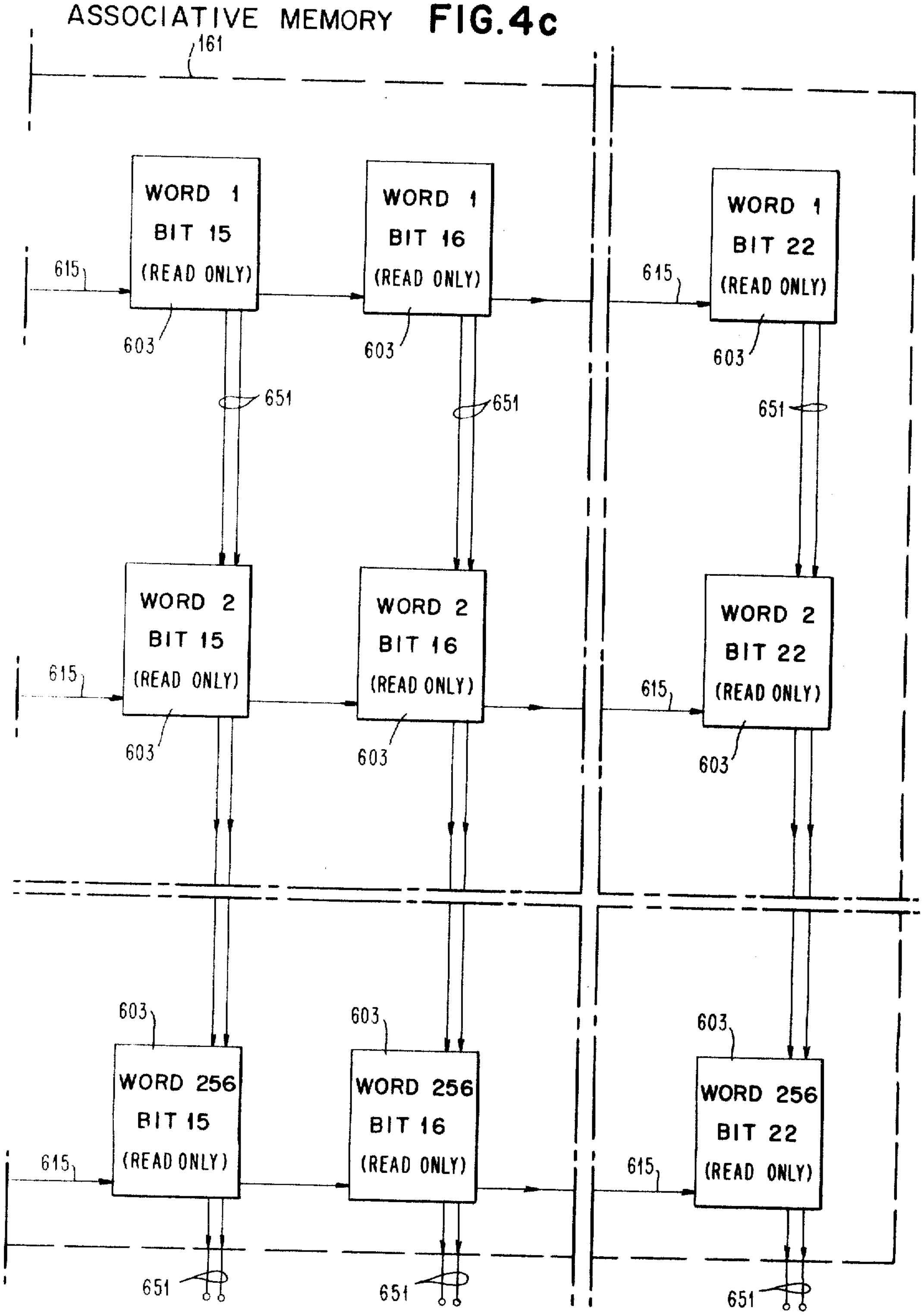

ASSOCIATIVE MEMORY
READ-WRITE STORAGE ELEMENT

MASK REGISTER
STORAGE ELEMENT

ARGUMENT REGISTER
STORAGE ELEMENT

ASSOCIATIVE
MEMORY
READ ONLY
STORAGE
ELEMENT

DECODER

May 2, 1967 H. HELLERMAN 3,317,898

MEMORY SYSTEM

Filed July 19, 1963 19 Sheets-Sheet 18

COMPARISON CIRCUIT

May 2, 1967 H. HELLERMAN 3,317,898

MEMORY SYSTEM

Filed July 19, 1963 19 Sheets-Sheet 19

3,317,898
Patented May 2, 1967

3,317,898

MEMORY SYSTEM

Herbert Hellerman, Yorktown Heights, N.Y., assignor to International Business Machines Corporation, New York, N.Y., a corporation of New York Filed July 19, 1963, Ser. No. 296,353
34 Claims. (Cl. 340—172.5)

This invention relates to a memory system and, more particularly, to a technique for sharing a large memory among several program-controlled processors.

Many conventional computers contain a high-speed memory, such as a magnetic core memory. The complexity of the problems which can be solved by a computer and the speed of solution are often limited by the size of the memory. Some computing installations contain several computers, each with its own memory, and the computers may be used singularly or cooperatively to solve problems of varying scope. In the present invention, a memory is shared by several processors, where each processor may be of any complexity. including a computer with or without an individual memory, the arithmetic portion of a computer, or a special purpose computer. Each procesosr may be operated under the control of one program at one time or several processors may be cooperatively operating under the control of a single program.

A primary advantage of sharing one large memory among several programs (controlling several processors) is the increased total computing potential which is available over that obtained when each program is limited to the memory available in the processor or processors controlled by the program. By using a single memory, each program has a potentially larger memory and is not limited to using a predetermined fraction of the total memory. The total memory requirements of the programs may not exceed the total available memory, but the total memory need not be divided among the programs according to predetermined fractions.

Obviously, a single memory can be partitioned among several programs by the intervention of a human being or a supervisory program which calculates the individual memory requirements of each program and allocates blocks of memory to each. Without a supervisory program, each program is required to specify memory locations (addresses) within the allocated blocks only and subsequent users of the same programs would ordinarily be required to adapt the programs to newly allocated memory addresses. If a supervisory program is used, as described in an article entitled, The Atlas Computer in Datamation, May 1961, at pages 23–27, the memory allocation is automated. In the present invention, memory allocation is automatically accomplished without the use of a supervisory program. Each program operates with its own addressing scheme that is unrelated to the operation of other programs and their addressing schemes. The addressing schemes do not have to be altered when the programs are reused. The addresses that are assigned to information in each program are considered to be pseudo-addresses which are converted into true main memory addresses by a directory. In this manner, when a program specifies the writing into or reading from memory according to its pseudo-addressing scheme, the directory automatically converts these addresses into true addresses for use by the main memory addressing system. Thus, if each processor is operating under the control of a program and is independent of the operation of the other processors, the memory allocation is completely automatic. When two or more processors are cooperatively operating under the control of a single program, only the memory allocation for these co-acting processors must be externally coordinated, as for example by a supervisory program. In this case any of the processors that are controlled by the single program can obtain access to any information in the main memory that is related to the program identifier.

It is thus a primary object of the present invention to enable a main memory to be used by a plurality of programs.

A further object is to enable a plurality of programs to control the addressing of a single main memory by the use of a directory which correlates the program identifiers and the pseudo-addresses used in the programs and the true main memory addresses.

Another object is to enable a plurality of programs having predetermined priorities to control the addressing of a single main memory by the use of a directory which correlates the program identifies and pseudo-addresses used in the programs and the true main memory addresses.

A still further object is to enable a plurality of programs to control the addressing of a single main memory by the use of a directory which correlates the program identifiers and the pseudo-addresses used in the programs and the true main memory addresses where blocks of the main memory are reserved for a program for the length of time that they are required and are then released for the subsequent use with other programs.

The foregoing and other objects, features and advantages of the invention will be apparent from the following more particular description of a preferred embodiment of the invention, as illustrated in the accompanying drawings.

FIGURES 3*a*–3*i* together form a detailed diagram of the preferred embodiment of the invention.

Figure 4D:
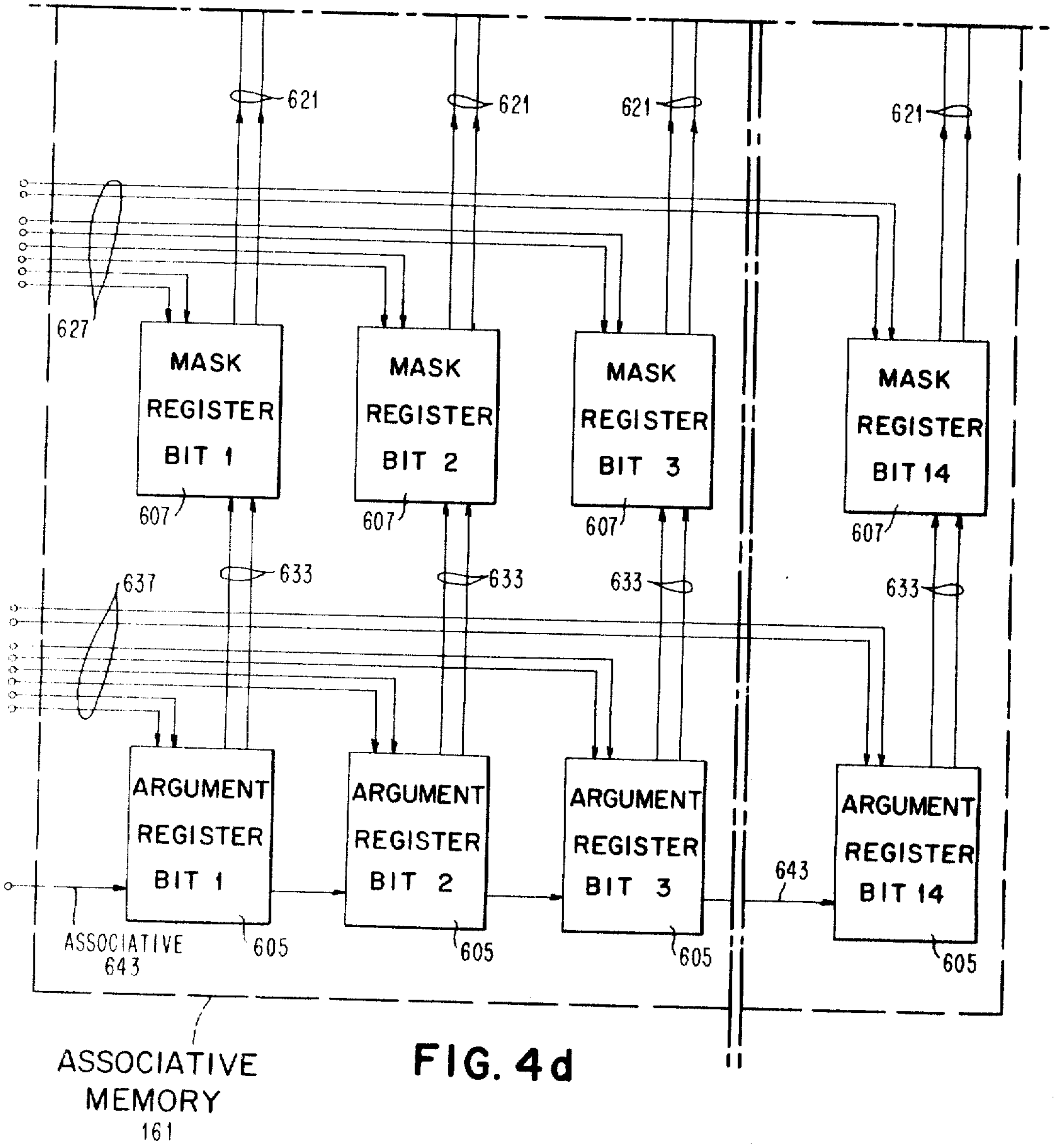
Figure 4:
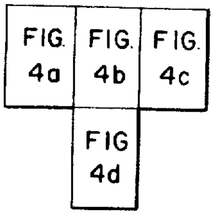
Figure 4A:
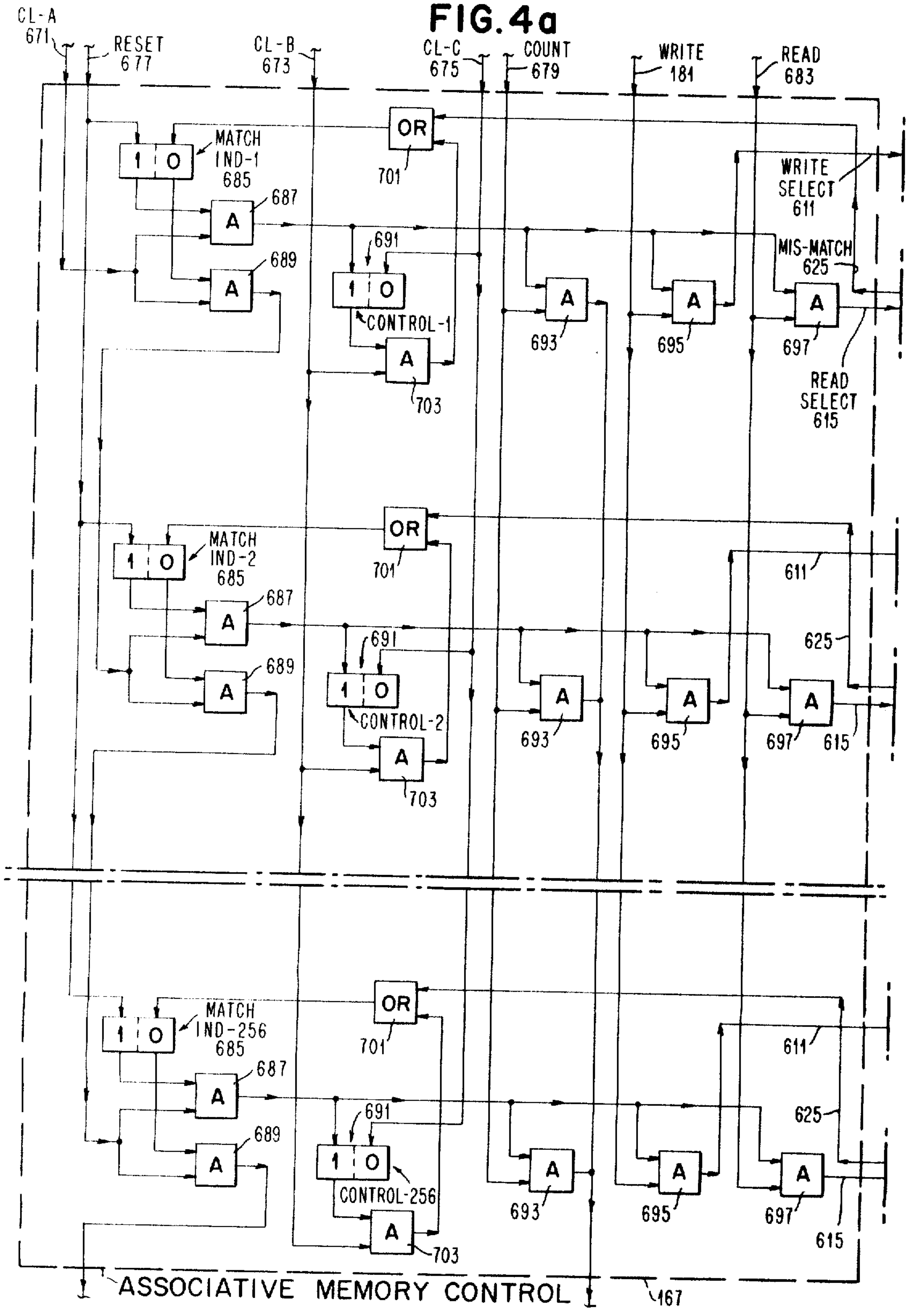

FIGURE 4 is another block diagram which shows the arrangement of FIGURES 4*a*–4*d* to form a unitary schematic diagram.

FIGURES 4*a*–4*d* together form a detailed diagram of an associative memory that is suitable for use in conjunction with the embodiment shown in FIGURES 3*a*–3*i*.

Figure 5:
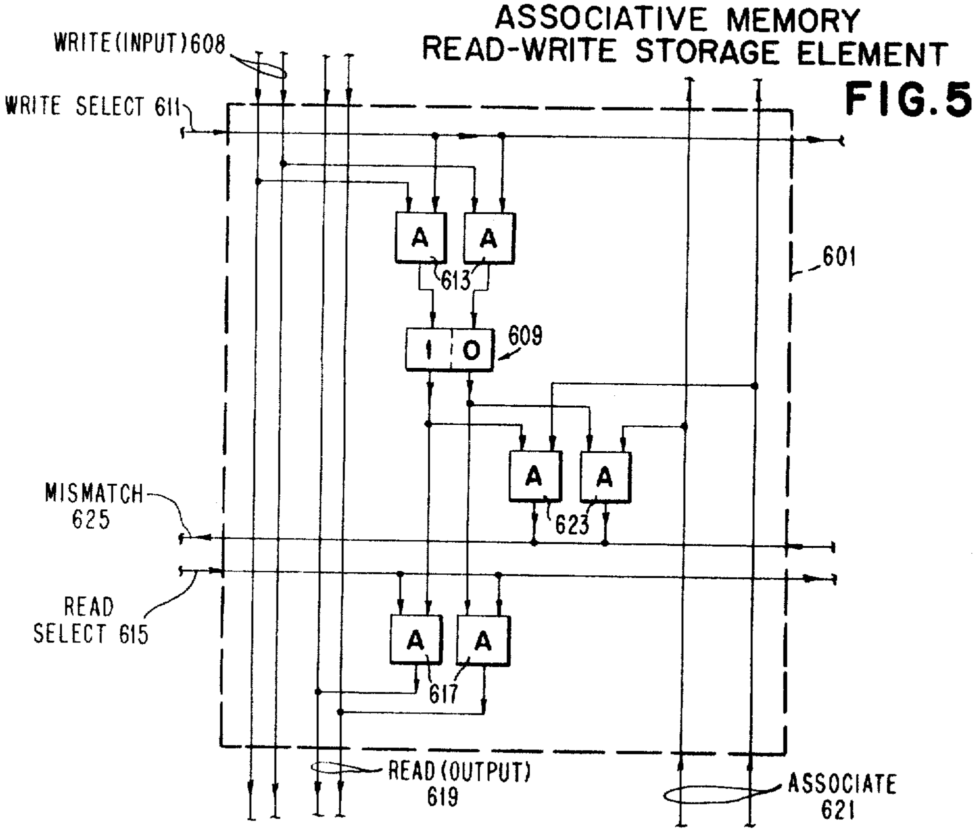

FIGURE 5 is a detailed diagram of one element of "read-write" memory contained in the associative memory shown in FIGURE 4.

Figure 6:
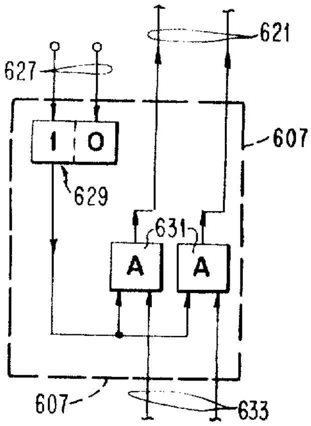

FIGURE 6 is a detailed diagram of one element of the mask register shown in FIGURE 4.

Figure 7:
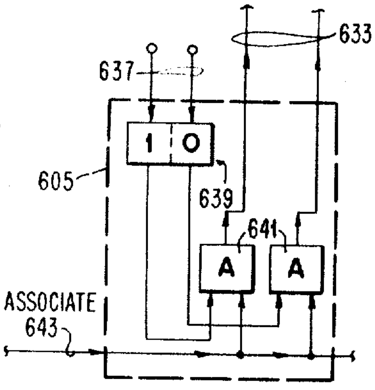

FIGURE 7 is one memory element of the argument register shown in FIGURE 4.

Figure 8:
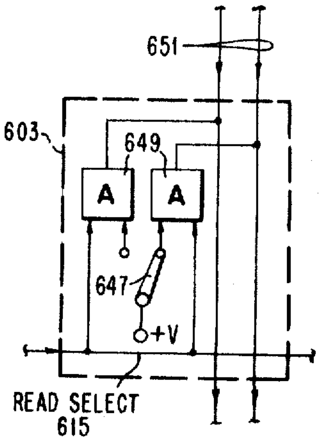

FIGURE 8 is a detailed diagram of one element of "read-only" memory contained in the associative memory shown in FIGURE 4.

Figures 3, 3A:
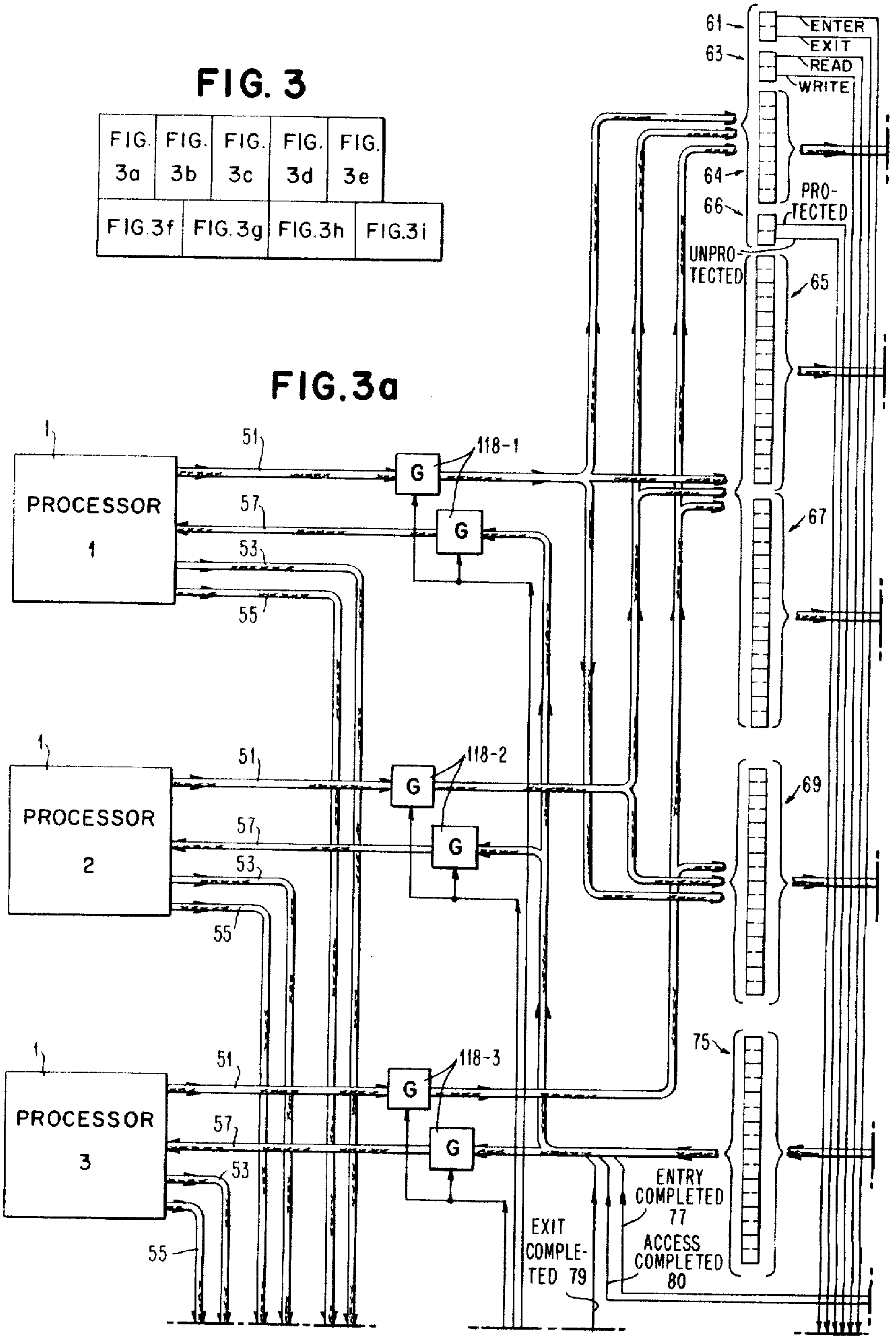
FIGURE 3 is a block diagram indicating the arrangement of FIGURES 3*a*–3*i* to provide a unitary schematic diagram.
Figure 9:
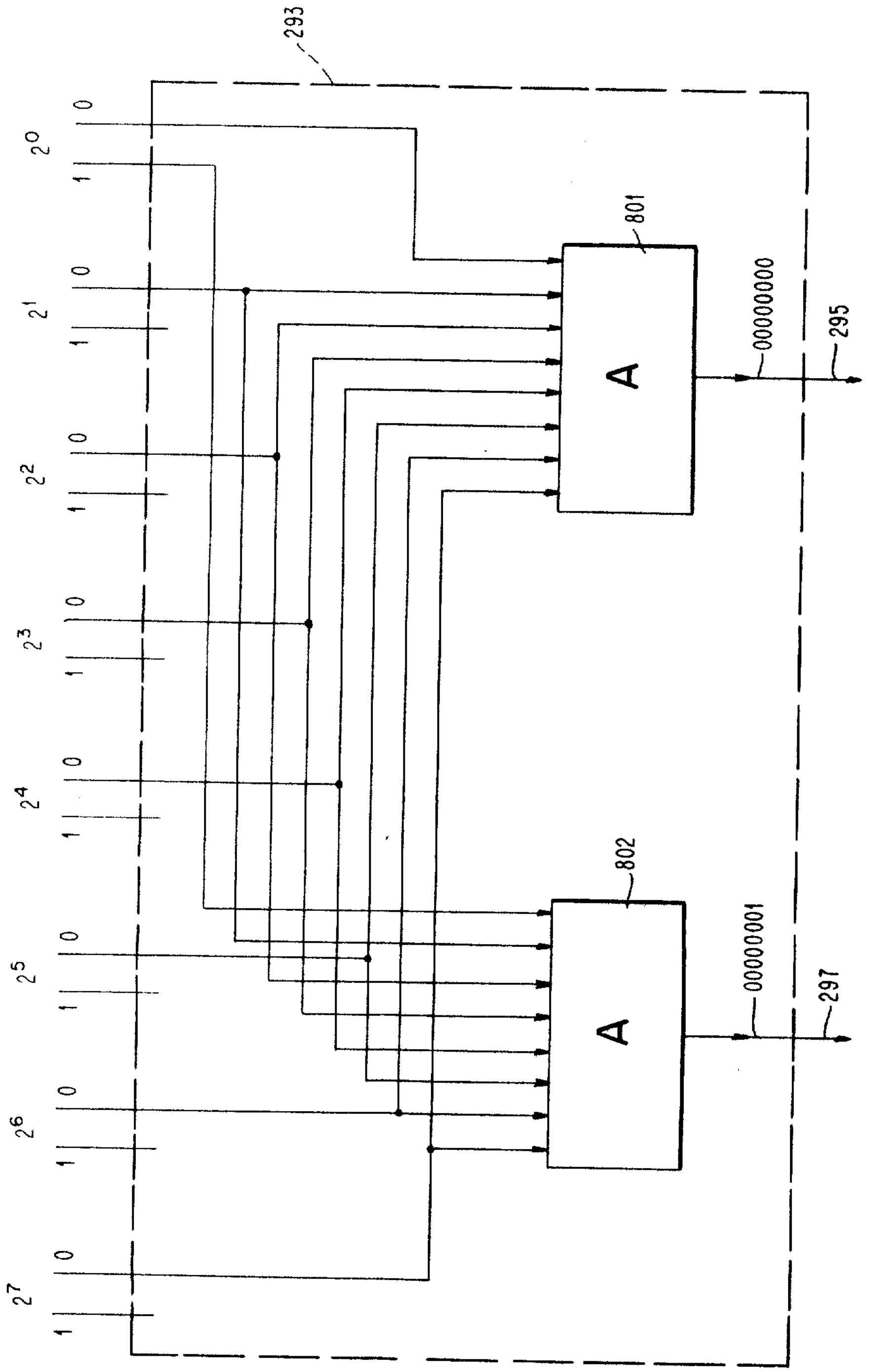

FIGURE 9 is a detailed diagram of a decoder that is suitable for use in the embodiment of FIGURE 3.

Figure 10:
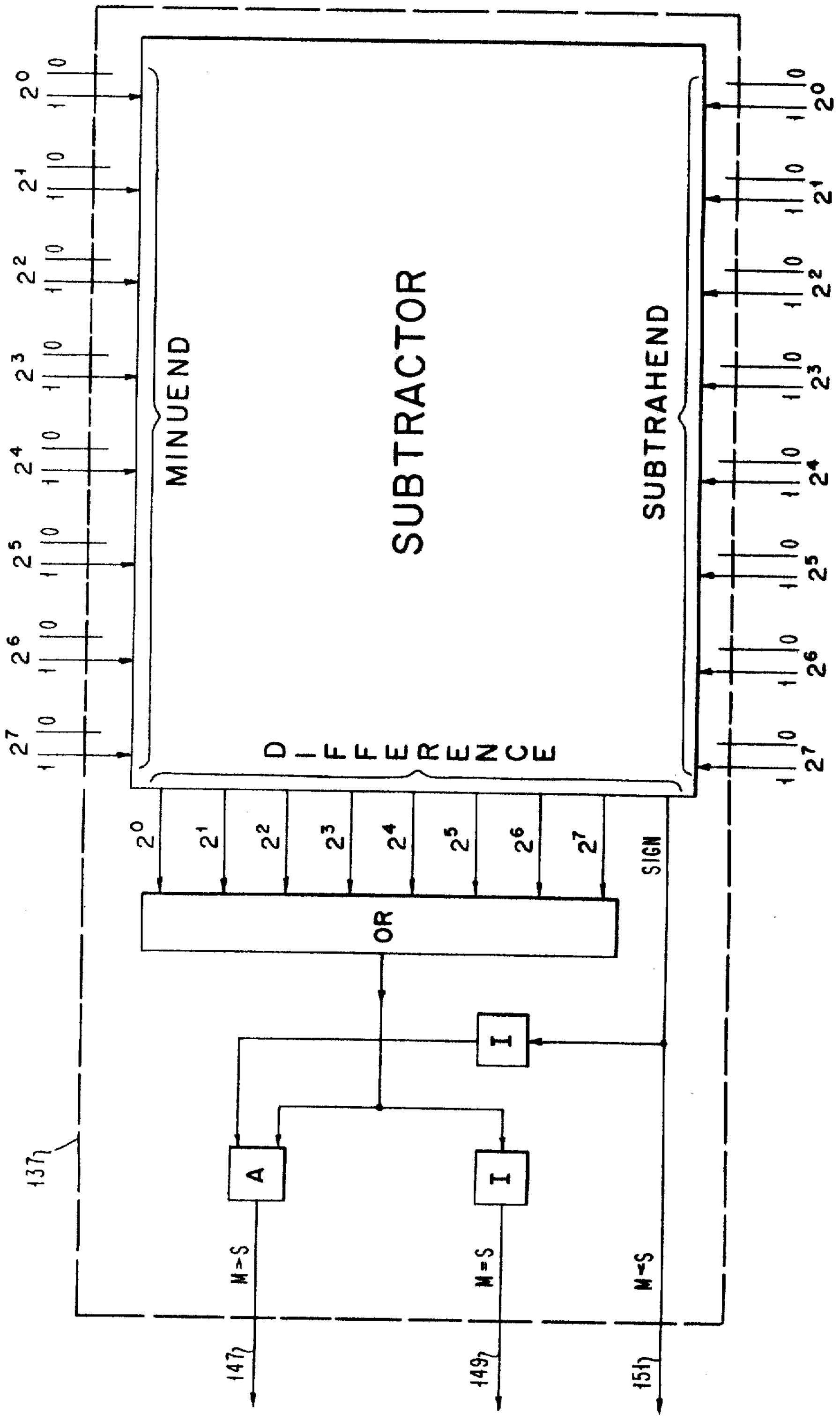

FIGURE 10 is a detailed diagram of a comparison circuit that is suitable for use in the embodiment of FIGURE 3.

Figure 11:
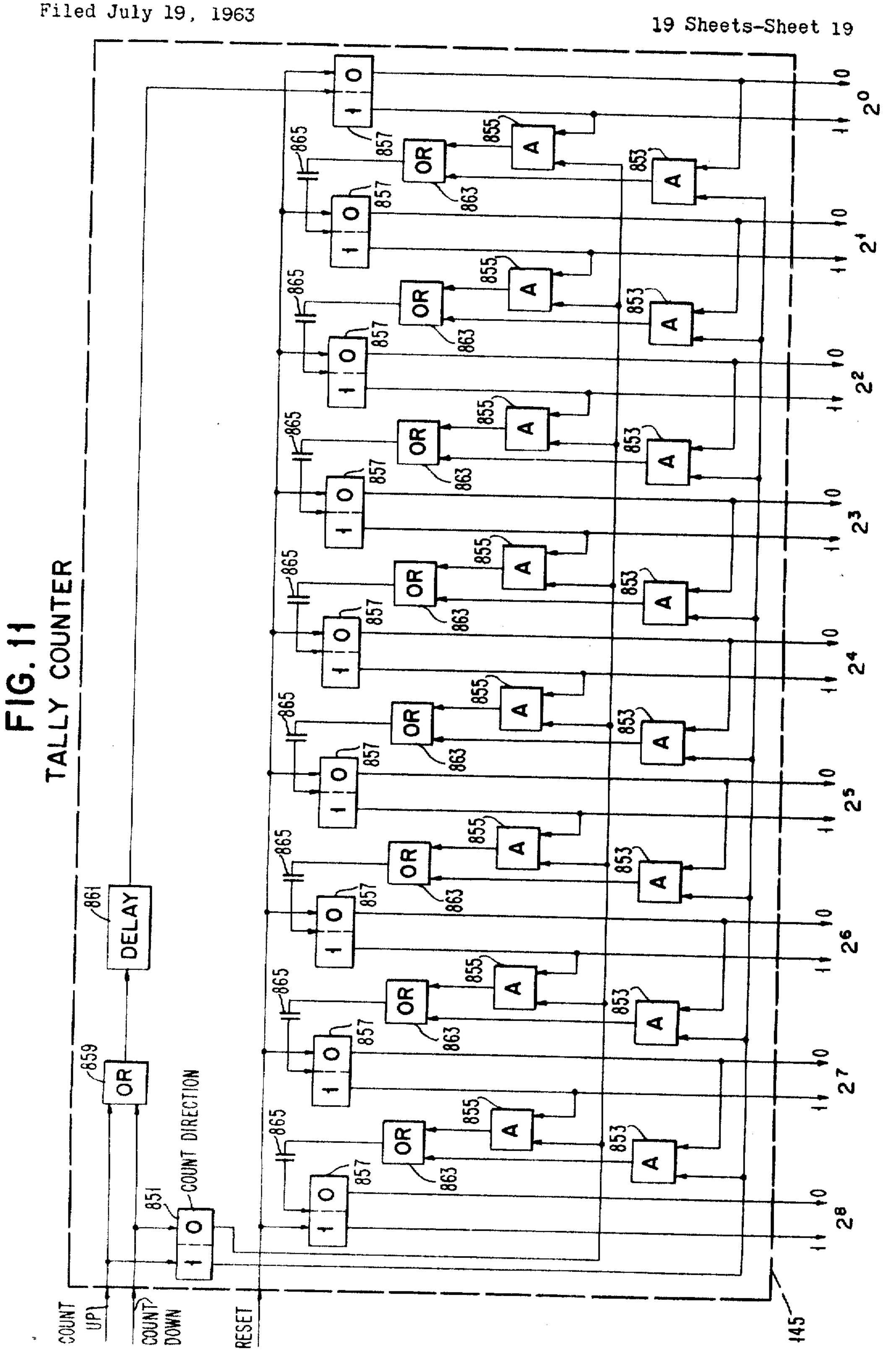

FIGURE 11 is a detailed diagram of a tally counter that is suitable for use in the embodiment of FIGURE 3.

The description of the invention is approached with three levels of detail. A basic description relates to the block diagram of FIGURE 1 and is followed by a more detailed functional description which is related to the diagram of FIGURE 2. Finally, a detailed description is provided which is based on the diagrams in FIGURES 3-8.

1. BASIC DESCRIPTION

Figure 1:
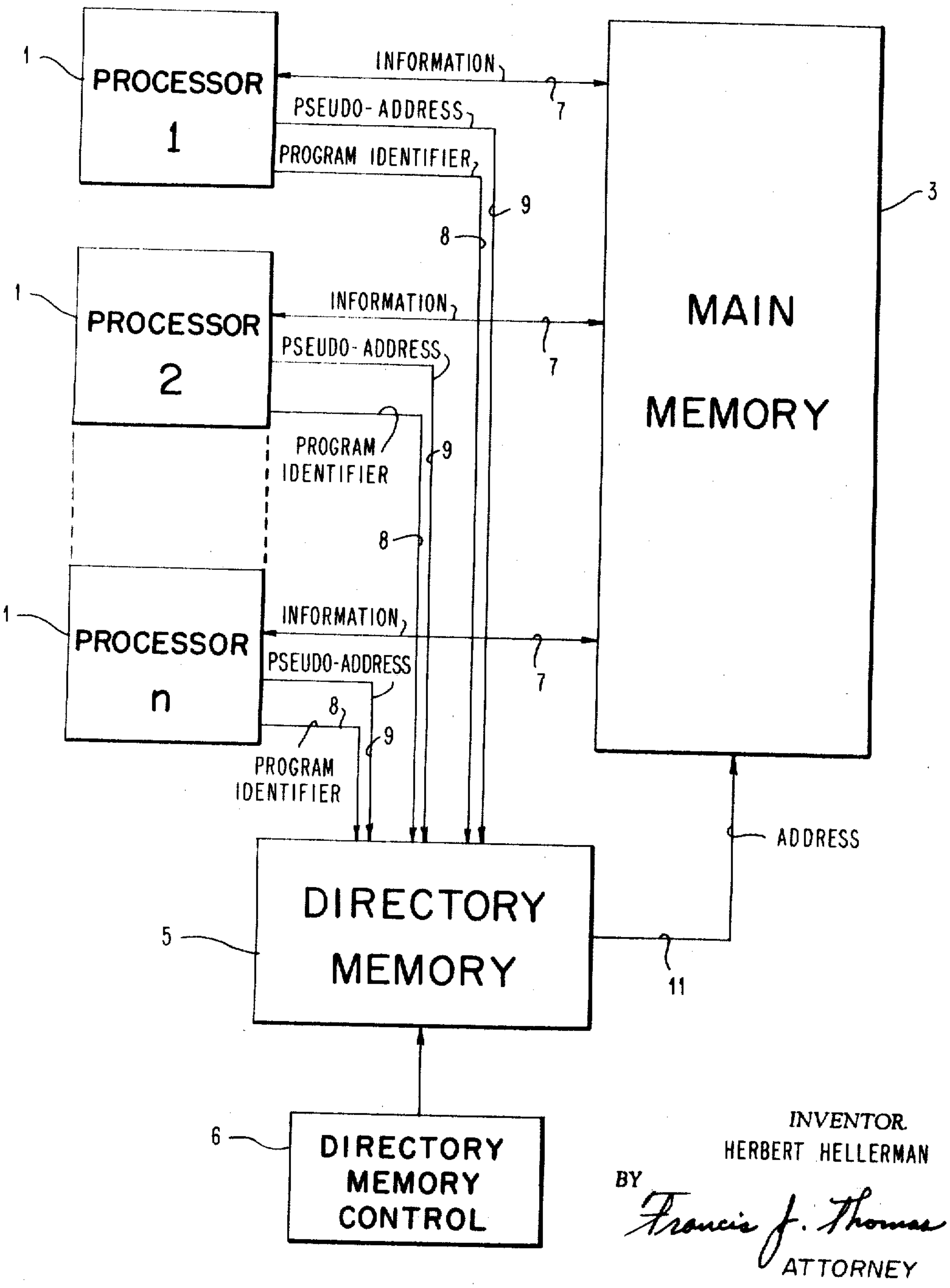
FIGURE 1 is a block diagram of the preferred embodiment of the invention.

In the block diagram of the preferred embodiment of the invention that is shown in FIGURE 1 each of a plurality of processors 1 shares a single main memory 3. A directory memory 5, under the supervision of a directory memory control circuit 6, correlates the program identifiers and pseudo-addresses specified by the processors with the true main memory addresses. Information is applied to and retrieved from the main memory on cables 7. The program identifiers and pseudo-addresses are applied on cables 8 and 9 to the directory memory 5 which transforms this information into main memory addresses which are transmitted on cable 11. The directory memory stores the correlation between the program identifiers, pseudo-addresses and the true addresses as the information from the processors is written into the main memory and is then capable of locating information according to pseudo-addresses in the main memory to be readout and transmitted to the corresponding processors. The control circuit prescribes the sequence of operation of the directory memory and assigns priority to particular processors and types of operations.

Only the basic functions of the system are shown in FIGURE 1 and many other features will be described in greater detail below with respect to the functional diagram of FIGURE 2 and the detailed diagram of FIGURE 3.

2. FUNCTIONAL DESCRIPTION

In the preferred embodiment of the invention, the main memory contains 256 blocks of storage, where each block contains 256 eight-bit words. The memory is addressed by a sixteen-bit word containing an eight-bit prefix and an eight-bit suffix. Each program specifies the number of blocks of main memory that are required and subsequently assigns addresses containing pseudo-prefixes and suffixes. Since the main memory is allocated in blocks, the program-originated suffixes are used as the suffixes of the true main memory addresses. However, as described above, the program-originated pseudo-prefixes are connected to true main memory prefixes by the directory.

In the preferred embodiment, each program is assigned a four-bit program identifier which is used by the directory, in addition to the pseudo-prefixes, to maintain the correlation between the processor addressing schemes and the true main memory addresses. The directory memory is a 256 word, 22-bit associative memory which is capable of storing applied information providing the information upon request, and indicating the location and number of stored words which correspond to selected portions or all of reference words. Each word in the directory memory is divided into five fields: a program identifier, a pseudo-prefix, a true prefix, a write field and a label field. The latter two fields serve a particular purpose which will be described in detail subsequently. The true prefixes are stored in a read-only portion of the directory and are correlated with the program identifiers and pseudo-prefixes when these items are entered (written) into the corresponding fields of the words in the associative memory that contain the true main memory prefixes.

Figure 2:
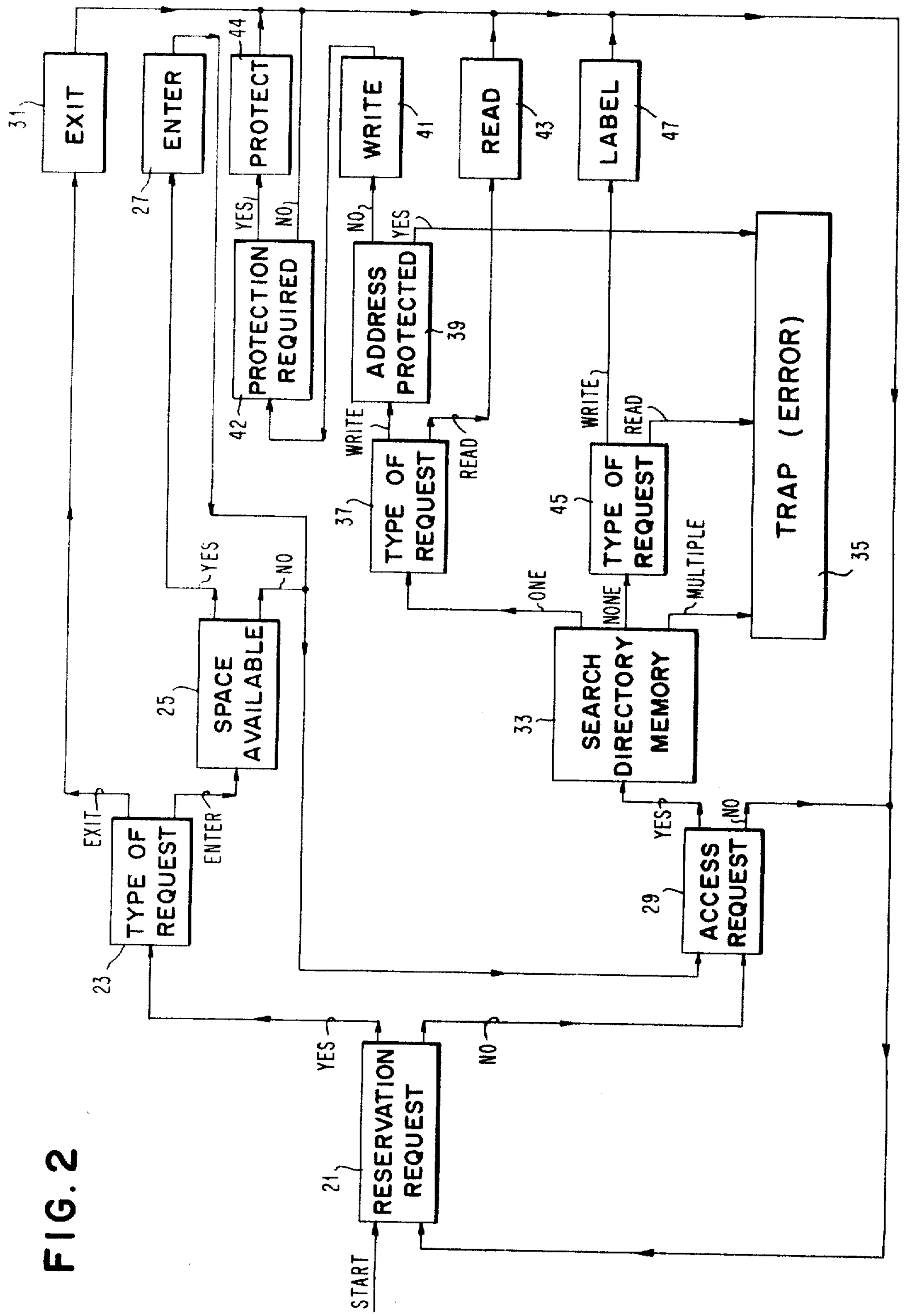
FIGURE 2 is a functional diagram of the preferred embodiment of the invention.

The operation of the system is shown functionally in step by step form in FIGURE 2. At the start of the operation of the system a "reservation request" circuit 21 ascertains whether any processor is signalling to reserve a portion of the main memory or to release previously-reserved memory locations which are no longer required. If a reservation request is present, the type of request is determined by a circuit 23 to be either an "enter" (to reserve locations) or "exit" (to release a prior reservation) request. When a program signals to release a previously-reserved section of the main memory, this section of the main memory is made available to be used subsequently by the same or another processor by an "exit" routine 31 and the entire cycle is initiated again with the operation of the "reservation request" circuit 21. When an "enter" reservation request is signalled, the availability of space in the main memory is determined by a circuit 25. If sufficient space is present, an "enter" routine 27 reserves the proper number of memory locations for the use of the signalling program (processor) by writing the program identifier in the directory at locations corresponding to unreserved main memory storage locations. After the "enter" routine, if space is available, or instead of this routine if insufficient space is available, an "access request" circuit 29 determines whether any program is signalling to store (write) or retrieve (read) information from the main memory. This circuit is also operated when the reservation request circuit 21 indicates that no "enter" or "exit" reservation is signalled by a program (processor). If no access request is present, the cycle is initiated again by the operation of the "reservation request" circuit 21. If an access request is present, the directory memory is searched by a circuit 33 for the presence of the program identifier and a pseudo-address which matches the pseudo-address described in the program. If the search of the directory memory provides a multiple response, an error is indicated by a signal to trap circuit 35. If the search of the directory memory provides exactly one response, the type of access request is ascertained by a circuit 37. If a "write" operation is indicated, a circuit 39 ascertains whether the address in the main memory in which the information is to be written is a "protected address," and if so, an error is indicated by a signal to the trap circuit 35. Certain addresses in the main memory are protected to insure that certain or all programs cannot alter the information stored at these addresses. For example, certain commonly required mathematical constants or tables may be stored in the main memory at protected addresses. If the address is not protected and a "write" request is signalled, the data is stored in the main memory by a "write" routine 41. Upon completion of the "write" routine a "protection required" circuit 42 determines whether the information that was written into the main memory should be protected from a later attempt to replace the information with other data. When the address is not to be protected, the operation of the system is recycled by a signal to the reservation request circuit 21. When protection is required, this fact is noted by a "protect" routine 44 and the system is recycled by a signal to the reservation request circuit 21. Returning to the type of request circuit 37, when a "read" request is signalled, a "read" routine 43 retrieves the stored information for transmission to the processor.

If the directory search by circuit 33 provides no response, the type of access request is ascertained by a circuit 45. If a "read" operation is signaled an error is indicated by a signal to a trap circuit 35. However, if a "write" request is signalled, the system enters a "label" routine 47. In this case, the pseudo-address described in the program is placed in the directory memory in a portion reserved by the corresponding program and, in a subsequent cycle of operation, when the directory is again searched for this program identifier and pseudo-address by circuit 33, a single response is indicated and, in the subsequent cycle of operation, when the directory is again searched for this program identifier and pseudo-address by circuit 33, a single response is indicated and, in the subsequent cycle, a "write" routine is performed (if the address is not protected).

3. DETAILED DESCRIPTION

Figure 3B:
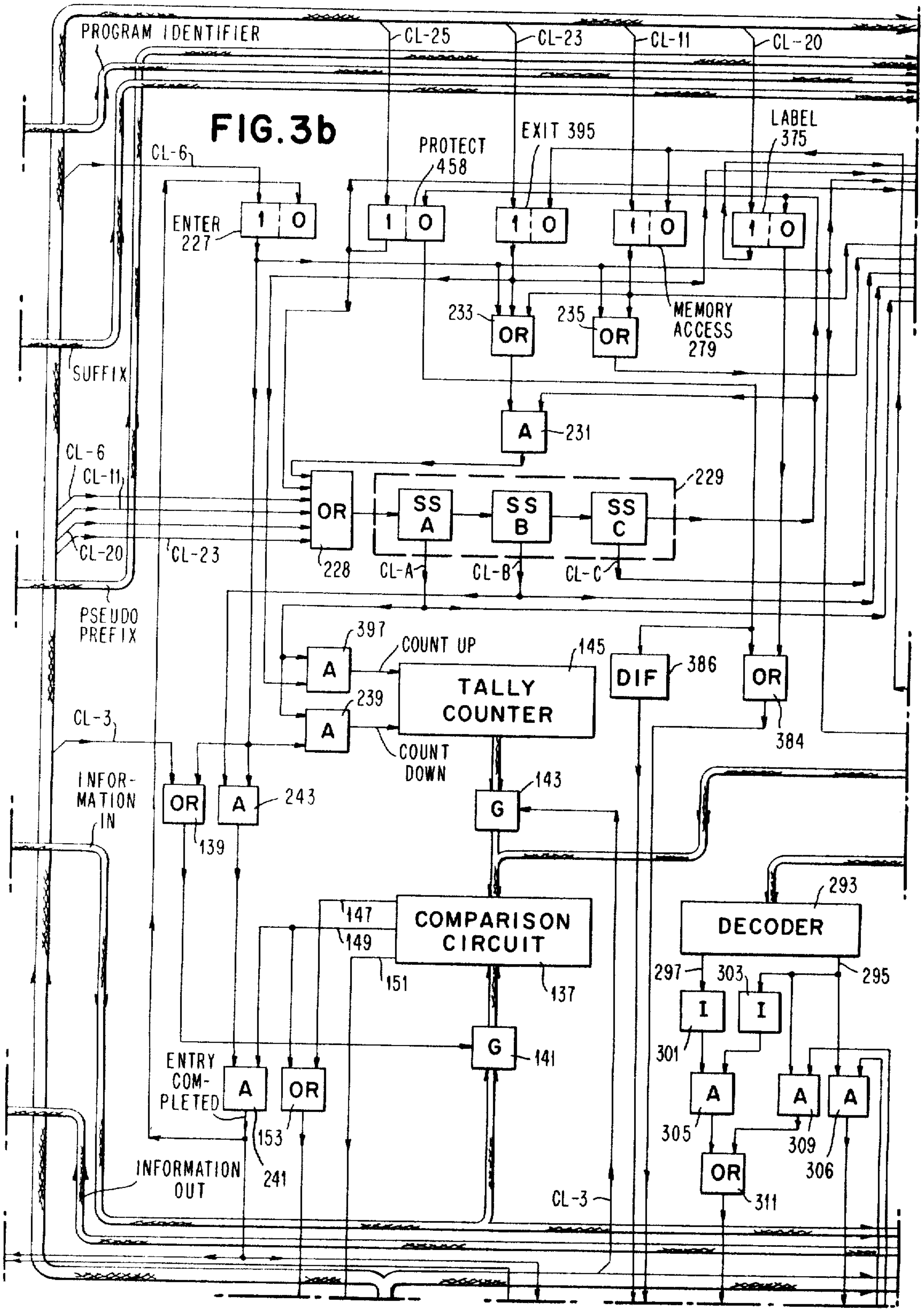
Figure 3C:
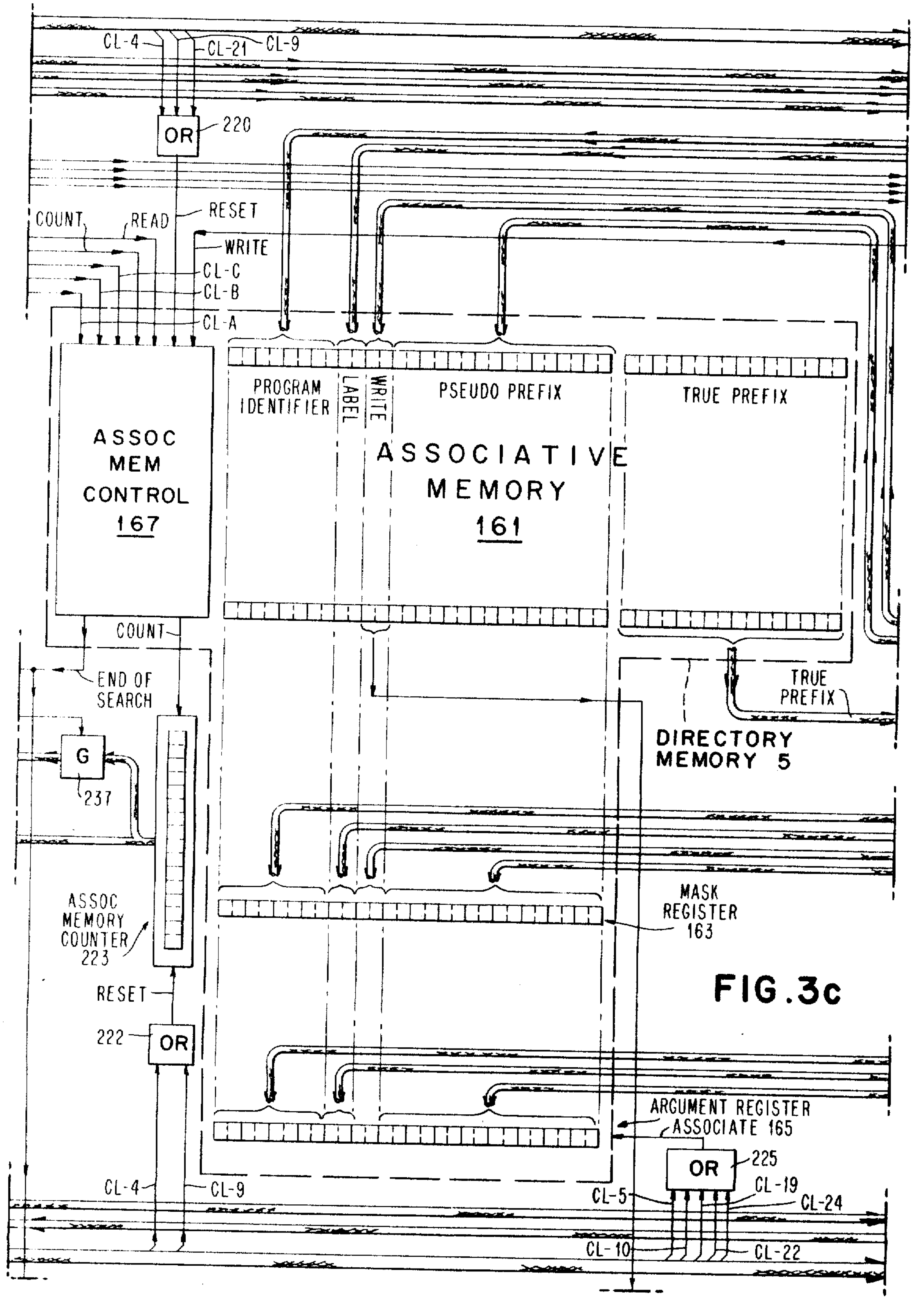
Figure 3D:
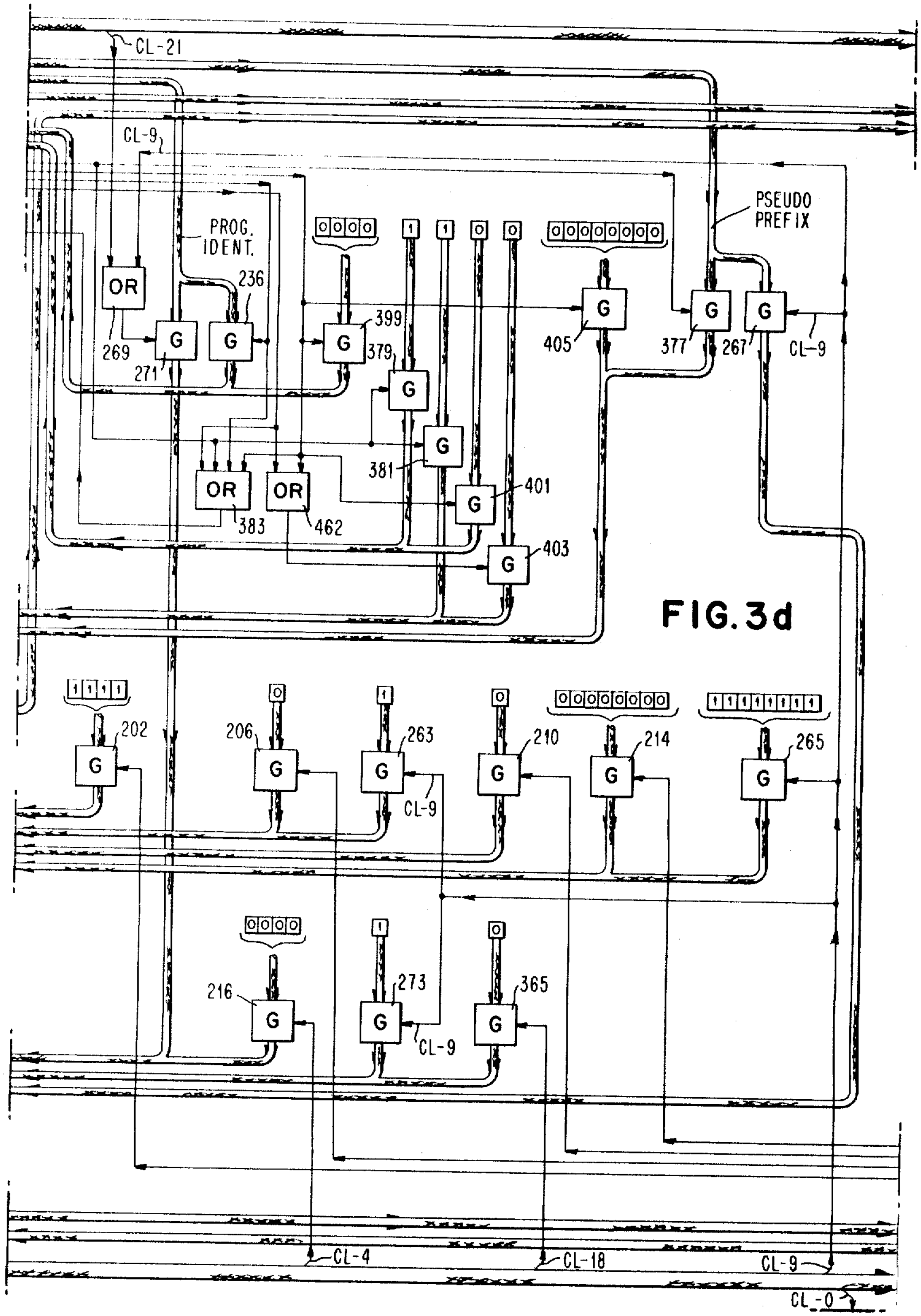
Figure 3E:
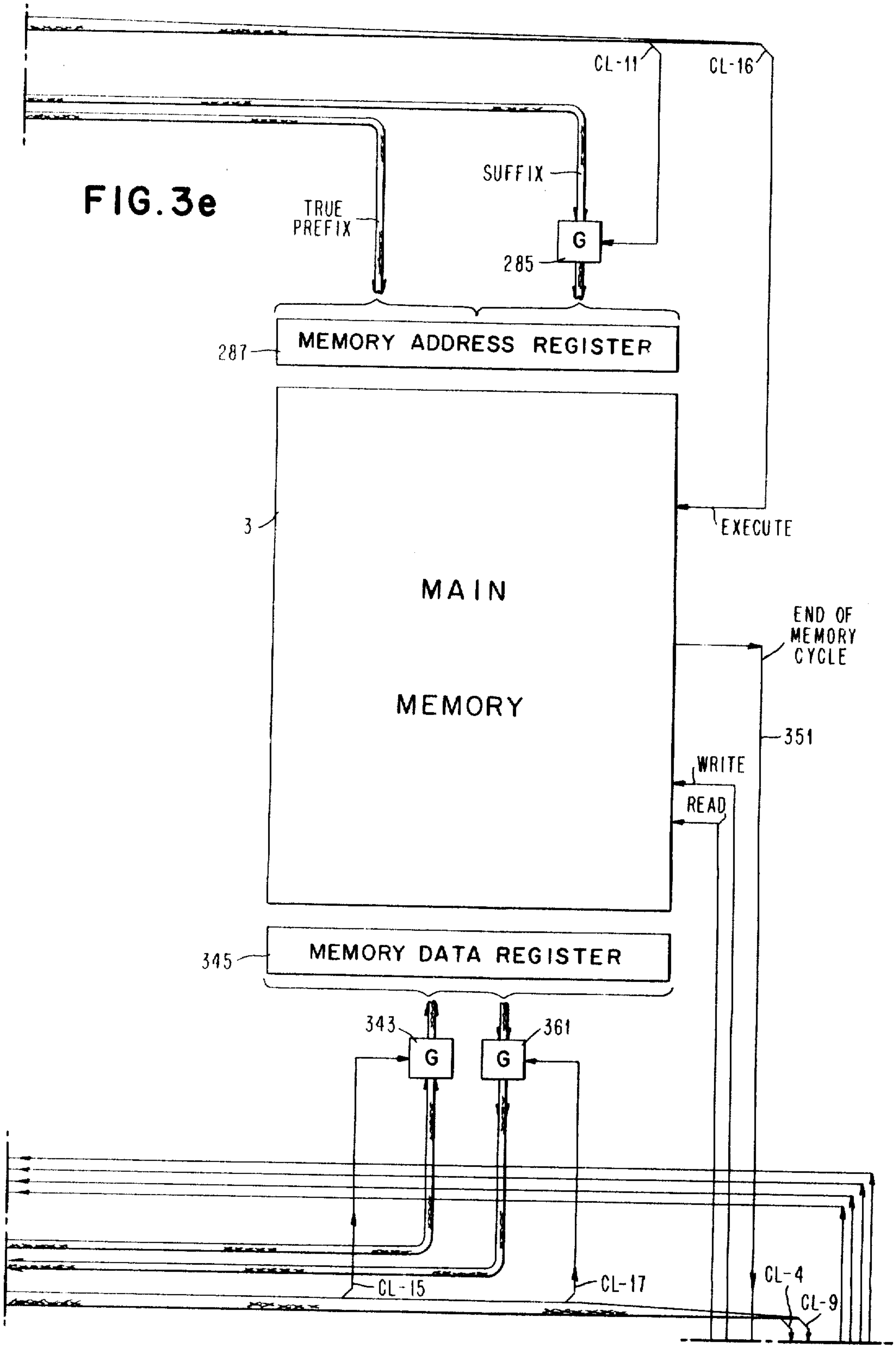

The memory system is shown in detail in FIGURE 3, where the processors 1 are shown in FIGURE 3*a*, the directory memory 5 in FIGURE 3*c*, the main memory 3 in FIGURE 3*e*, and the system controls in FIGURES 3*b*, *d*, *f*, *e*, *h* and *i*. Although the preferred embodiment of the invention includes sixteen processors, only three are shown in FIGURE 3 to simplify the diagram. Each processor applies information to the memory system on three input cables 51, 53 and 55 and receives information from the memory system on a cable 57. The data from the processors is stored in buffer registers 61, 63, 64, 65, 66, 67, 69, 71 and 73 (FIGURES 3*a* and 3*f*) as follows:

| Register | Figure | No. of Bits | Information Stored |
|---|---|---|---|
| 61 | 3a | 1 | Type of Reservation Request (1=Enter, 0=Exit). |
| 63 | 3a | 1 | Type of Access Request (1=Read, 0=Write). |
| 64 | 3a | 4 | Program Identifier. |
| 65 | 3a | 8 | Address Suffix. |
| 66 | 3a | 1 | Memory Protection Control (1=Protected, 0=Unprotected). |
| 67 | 3a | 8 | Address Pseudo-Prefix. |
| 69 | 3a | 8 | Information (Data or Reservation Requirement). |
| 71-1 | 3f | 1 | Reservation Request—Processor 1. |
| 71-2 | 3f | 1 | Reservation Request—Processor 2. |
| 71-3 | 3f | 1 | Reservation Request—Processor 3. |
| 73-1 | 3f | 1 | Access Request—Processor 1. |
| 73-2 | 3f | 1 | Access Request—Processor 2. |
| 73-3 | 3f | 1 | Access Request—Processor 3. |

Information is returned to the processor from an eight-bit buffer register 75 (FIGURE 3*a*) on cable 57. Control data consisting of an "entry completed" signal 77, an "exit completed" signal 79, and an "access completed" signal 80 (FIGURE 3*a*) is also applied to the processors on cable 57.

The operation of the memory system shown in FIGURE 3 is to be described with respect to the various functions that are performed as discussed above with respect to FIGURE 2. A clock circuit (FIGURES 3*g*, *h* and *i*) sequentially generates timing signals to effect the operations shown in FIGURE 2. The clock circuit generates timing signals labelled "CL–0," "CL–1," etc., through "CL–25" which are applied to the various circuits through a cable which begins on FIGURE 3*i* and travels through FIGURE 3*h*, then FIGURE 3*g*, then FIGURE 3*f*, to FIGURE 3*b* where it branches into two cables, each of which goes through FIGURE 3*c* and FIGURE 3*d* to FIGURE 3*e*. The timing signals are generated by conventional single-shot multivibrators which are labelled "SS–0," "SS–1," etc., through "SS–25." Each "single-shot" provides the correspondingly-numbered timing signal on the lead connected to the bottom of the block promptly upon application of an input signal on the lead connected to the left side of the block. The timing signal is a pulse having a duration that depends upon the circuit parameters. Some of the single-shots provide a second output on the lead connected to the right side of the block. This signal occurs as the device returns to its quiescent state of operation (at the time that the "CL" timing signal terminates).

(a) *Reservation request* (*CL–0, CL–1*)

Figure 3F:
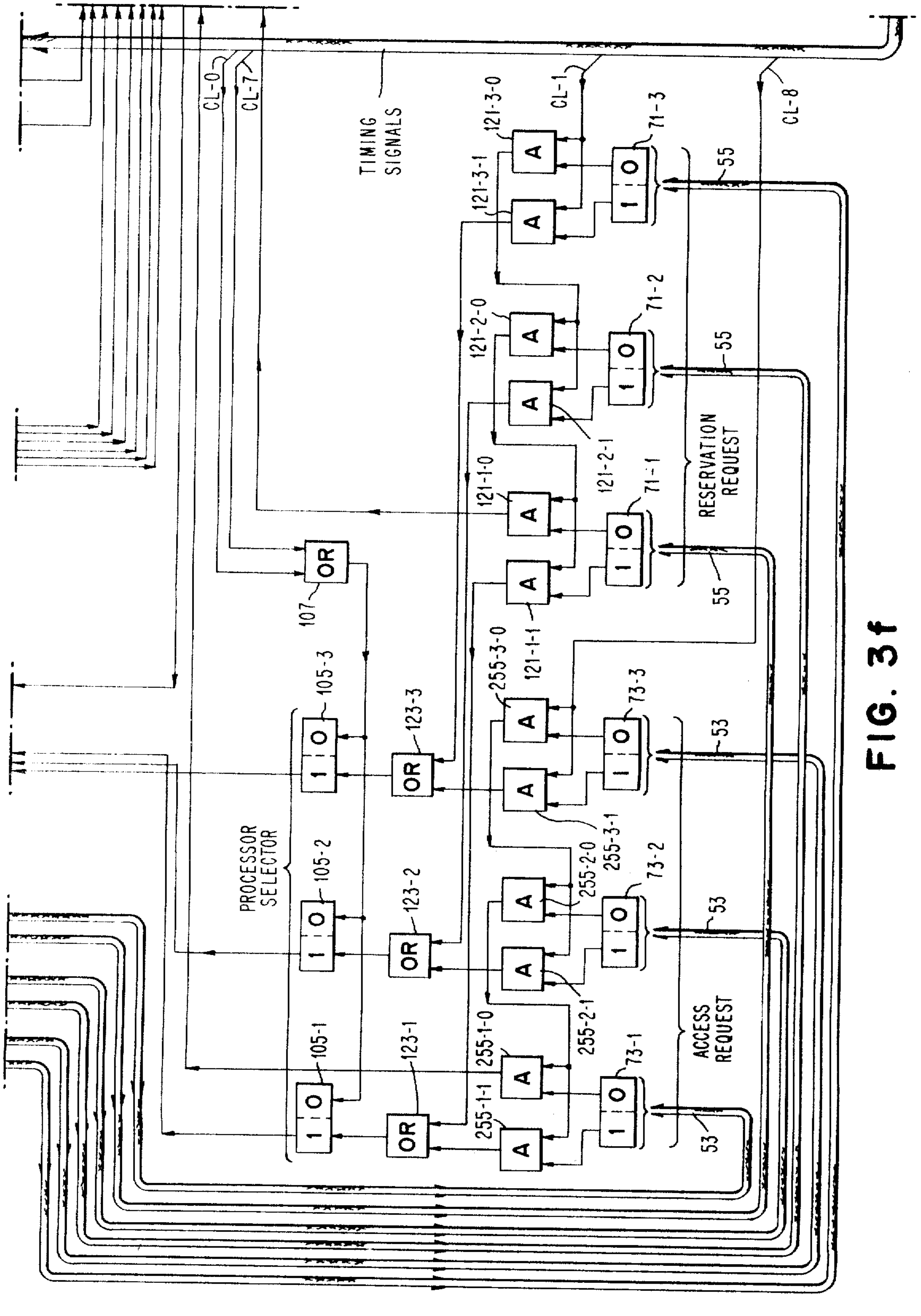
Figure 3G:
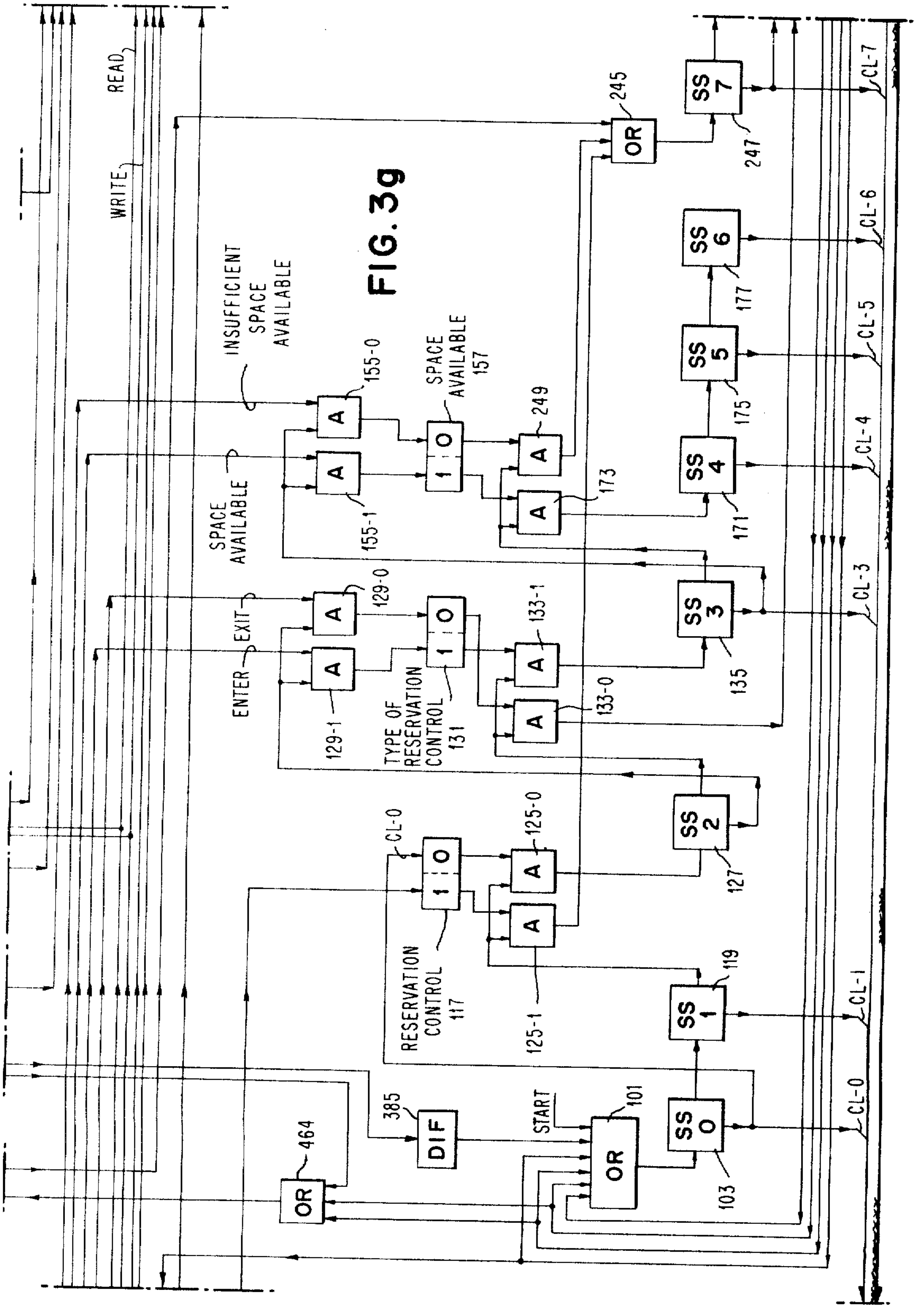
Figure 3H:
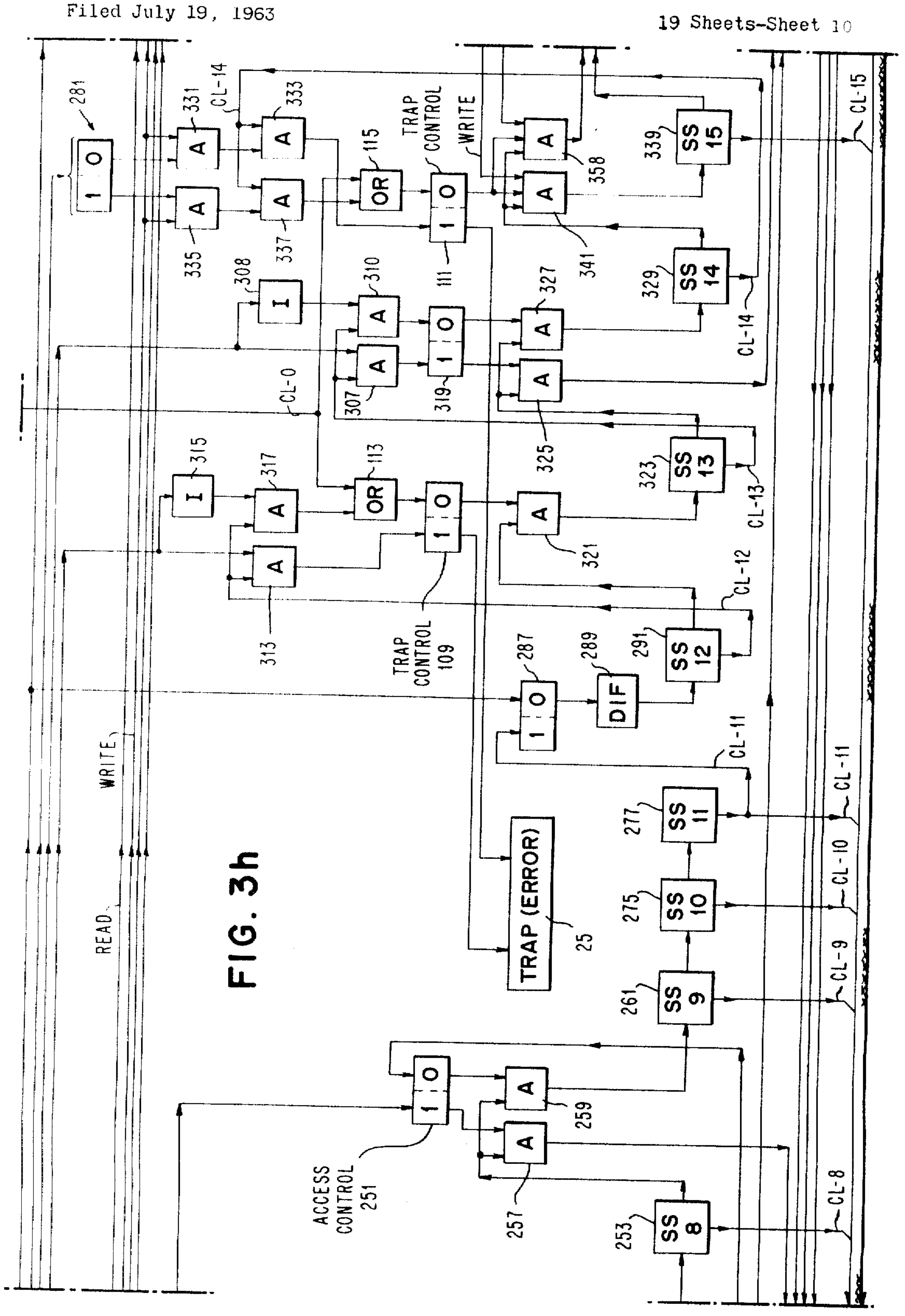

As shown functionally in FIGURE 2, the first step involves a determination of whether a reservation request is being signalled by a processor. In FIGURE 3*g*, a "start" signal is applied through an "or" gate 101 to initiate the operation of the "SS–0" single-shot 103 which promptly generates the CL–0 timing signal. This signal resets a group of "processor selector" bistable devices 105–1, a 105–2 and 105–3 (FIGURE 3*f*) through an "or" gate 107 (FIGURE 3*f*), and resets two "trap control" bistable devices 109 and 111 (FIGURE 3*h*) through "or" gates 113 and 115 (FIGURE 3*h*). The operation of the "processor selector" and "trap control" circuits is described in detail subsequently. The CL–0 timing signal is also applied to reset a "reservation control" bistable device 117 (FIGURE 3*g*). The delayed signal from the SS–0 single-shot 103 (which occurs when the circuit returns to its quiescent state) is used to initiate the operation of the SS–1 single-shot 119 which, in turn, generates the CL–1 timing signal. This timing signal is applied to sense the status of the "reservation request" bistable devices 71–1, 71–2 and 71–3 (FIGURE 3*f*). In the preferred embodiment of the invention, first priority is given to processor 3, second priority to processor 2 and least priority to processor 1. This priority is permanently effected by the circuit configuration but could obviously be controllable by switches or a supervisory program. The CL–1 signal is applied to a pair of "and" gates 121–3–1 and 121–3–0 (FIGURE 3*f*) to ascertain whether processor 3 is signalling for a reservation request. As described above, the status of this bistable device is controlled by a signal from processor 3 on cable 55. When a reservation is requested, bistable device 71–3 provides a conditioning signal on its "1" output to "and" gate 121–3–1. In this case, "and" gate 121–3–1 passes a signal through an "or" gate 123–3 to set a "processor 3 selector" bistable device 105–3. When processor 3 is not signalling for a reservation request, bistable device 71–3 provides a conditioning signal on its "0" output to "and" gate 121–3–0, which passes a signal to sense the status of bistable device 71–2. When processor 2 is signalling a reservation request, this bistable device is set to provide a "1" output which is passed by "and" gate 121–2–1 and "or" gate 123–2 to set the "processor 2 selector" bistable device 105–2. Similarly, when neither processor 3 nor processor 2 is signalling a reservation request, the status of bistable device 71–1 is sensed by "and" gates 121–1–1 and 121–1–0 and, if processor 1 is signalling for a reservation request, a signal is passed through "or" gate 123–1 to set the "processor 1 selector" bistable device 105–1. When no processor is signalling for a reservation request, "and" gate 121–1–0 provides a signal to return the "reservation control" bistable device 117 (FIGURE 3*g*), to the status present before the CL–0 signal was applied. Thus, the "reservation control" bistable device maintains a signal at its "0" output only if a reservation request is signalled. Each "processor selector" bistable device 105–1, 105–2 and 105–3 (FIGURE 3*f*) controls a pair of gates 118–1, 118–2, 118–3 (FIGURE 3*a*) which, in turn, pass information between the selected processor 1 and the buffer registers 61, 63, 64, 65, 66, 67, 69 and 75.

(b) *Type of reservation request* (*CL–2*)

As shown functionally in FIGURE 2 if a reservation request is signalled, it must next be determined whether to "enter" a reservation for main memory space (storage locations) or to "exit" a previously-entered reservation. In FIGURE 3*g*, the "reservation control" bistable device 117 provides a conditioning signal ("0" output lead) for an "and" gate 125–0 if a reservation request is signalled and, when the SS–1 single-shot returns to its quiescent state of operation, the "and" gate passes a signal to initiate the operation of the SS–2 single-shot 127 which promptly generates the CL–2 timing signal. This signal conditions two "and" gates 129–1 and 129–0 which provide the control signals for a "type of reservation control" bistable device 131. The type of reservation is stored in buffer register 61 (FIGURE 3*a*) where a "1" indicates an "enter"

request and a "0" indicates an "exit" request. The outputs of this register are applied to "and" gates 129–1 and 129–0 (FIGURE 3*g*) the appropriate one of which, at the occurrence of the CL–2 timing signal, supplies a signal to the "type of reservation control" bistable device 131, whereby a "1" output is provided when a reservation is to be entered and a "0" output is present when a reservation is to be exited.

(c) *Space availability* (*CL–3*)

As shown functionally in FIGURE 2, when an "enter" reservation request is signalled, the availability of space in memory is ascertained by a circuit 25. In FIGURE 3*g*, the "type of reservation control" bistable device 131 provides a signal at its "1" output when a reservation is to be entered. When the SS–2 single-shot 127 returns to its quiescent state of operation, a signal is applied to two "and" gates 133–1 and 133–0, and, when bistable device 131 provides a "1" output, a signal is supplied by "and" gate 133–1 to initiate the operation of the SS–3 single-shot 135, which, in turn, generates the CL–3 timing signal. At this time, a comparison circuit 137 (FIGURE 3*b*) ascertains whether the main memory contains enough unreserved locations (blocks) to satisfy the requirements of the program which is controlling the processor that is signalling to enter a reservation request. The comparison circuit is described in detail with respect to FIGURE 10. The CL–3 timing signal is applied through an "or" gate 139 (FIGURE 3*b*) to condition a gate 141 which passes a number representing the number of blocks of main memory that are required from buffer register 69 (FIGURE 3*a*) to the comparison circuit 137 (FIGURE 3*b*). The CL–3 timing signal also conditions gate 143 (FIGURE 3*b*) which passes the data stored in a tally counter 145 as the second input to the comparison circuit 137. The tally counter is described in detail with respect to FIGURE 11. The data in the tally counter represents the amount of space (number of blocks of main memory) that are available. This counter continuously monitors the amount of available space in the main memory. The tally counter is preset to a number equal to the total number of blocks in main memory (256 in the preferred embodiment) and is counted down as blocks of memory are reserved (entered) and counted up as blocks are released (exited). The circuits which control the counting in the tally counter are described subsequently. The comparison circuit 137 provides a signal on one of three output leads 147, 149 and 151, where a signal is provided on lead 147 when there is more than enough space available, on lead 149 when there is exactly enough space available, and on lead 151 when there is insufficient space available. When there is more than enough, or exactly enough space available, an "or" gate 153 generates a "space available" signal to condition an "and" gate 155–1 (FIGURE 3*g*). When insufficient space is available, the output lead 151 of the comparison circuit 137 (FIGURE 3*b*) passes a conditioning signal to an "and" gate 155–0 (FIGURE 3*g*). Timing signal CL–3 is also applied to "and" gates 155–1 and 155–0, the appropriate one of which passes a signal to control a "space available" bistable device 157. This device provides a signal at its "1" output when a sufficient number of main memory blocks are available to fill the demand of the controlling program. A signal is present at the "0" output of device 157 when an insufficient number of blocks of main memory are available. When sufficient space is available, an "enter" routine is initiated to reserve the required number of blocks of main memory.

(d) *Routines in general*

As described above, the directory memory 5 (FIGURE 3*c*) contains an associative memory 161 comprising 256 22-bit words including fourteen bits of storage that are alterable (read-write memory) and eight bits of storage that are not readily alterable (read-only memory). Each word comprises a four-bit "program identifier" field, a one-bit "label" field, a one-bit "write" field, an eight-bit "pseudo-prefix" field, and an eight-bit "true prefix" field (read-only memory). The directory memory 5 also includes a mask register 163, an argument register 165, and control circuits 167. An associative memory is one wherein the stored words can be compared to preselected information (argument) in one or more columns of fields (mask). A comparison can be made which indicates the first word in the associative memory that corresponds to (matches) the argument in the masked fields or sequential comparisons can be made to count the number of words in the associative memory which match the argument in the masked fields. A suitable associative memory is shown in a United States patent application, Ser. No. 120,213, filed June 28, 1961, by H. Fleischer and R. I. Roth. The associative memory and controls are also shown in detail in FIGURES 4–7 and are described subsequently.

The "true prefix" field (read-only) of the directory memory contains 256 different eight-bit words including every word from 00000000 to 11111111. These words correspond to the true prefixes of the 256 blocks of main memory storage. During an "enter" routine, program identifiers corresponding to the program which is controlling the reservation of memory are written in the "program identifier" field of the read-write portion of the directory memory. During a "label" routine, the block pseudo-prefix used by the corresponding processor is written into the corresponding eight-bit field of the directory memory and a "1" is written into the one-bit "label" field, and the one-bit "write" field (to indicate that information may be written into the labelled field). During a "write" routine, information is written into the main memory at the address corresponding to the true prefix specified by the directory memory and the suffix specified by the processor if the "1" bit that was written into "write" field has not been removed by a "protect" routine. During an "exit" routine "0's" are written into all fields of the read-write portion of the directory memory in rows corresponding to the program which is releasing its reservation. A "protect" routine places a "0" bit in the write field when no further data is to be written in the corresponding block of main memory. This operation prevents subsequent programming errors from erasing or replacing the information in the protected block. This operation is initiated by the application of a "protect" signal from the corresponding processor as the last word to be written into the corresponding block of main memory is applied. Stored data that is protected in this manner can only be destroyed by an "exit" routine.

The 22-bit mask register 163 contains "1" bits in the positions corresponding to the field (column or columns) in the read-write portions of the directory which are to be compared to an argument during an association operation. The argument is contained in a 22-bit register 165.

(e) *Enter routine* (*CL–4, CL–5, CL–6*)

As shown functionally in FIGURE 2, when space is available in the main memory an "enter" routine 27 is initiated. During this operation, the program identifier is inserted in the directory memory 5 (FIGURE 3*c*) at one location for each block of the main memory which is to be reserved (entered).

The "enter" routine is initiated by a signal generated by an "and" gate 173 (FIGURE 3*g*) when the SS–3 single-shot 135 returns to its quiescent state and when there is sufficient space in the main memory (as indicated by a signal from the "1" output of the "space available" bistable device 157). The SS–4 single-shot, in turn, generates the CL–4 signal and, after a period of time, returns to its quiescent state to initiate the operation of the SS–5 single-shot 175. This single-shot promptly generates the CL–5 signal and, after a period of time, returns to its quiescent state to initiate the operation of the SS–6 single-shot 177, which, in turn, generates the CL–6 signal. These three timing signals (CL–4, CL–5 and CL-6) synchronize the "enter" routine. The CL-4 timing signal prepares the mask register 163 and argument register 165 for an association operation to locate the words in the associative memory that correspond to available blocks of storage in the main memory. The CL-4 timing is applied through an "or" gate 200 (FIGURE 3*i*) to a gate 202 (FIGURE 2*d*) which passes "1" bits to the "program identifier" field of the mask register 163 (FIGURE 3*c*). CL-4 is also applied through "or" gates 204, 208 and 212 (FIGURE 3*i*) to condition gates 206, 210 and 214 (FIGURE 3*d*), respectively, which pass "0" bits to the "label" field, the "write" field, and the pseudo-prefix field of the mask register 163 (FIGURE 3*c*). In this manner the mask register is prepared to limit the subsequent association to the "program identifier" field only. Since the associative memory is to be searched for corresponding unreserved blocks of main memory, the data in the "program identifier" field is compared to "0000" in the association operation. To accomplish this, the "program identifier" field, the argument register 165 (FIGURE 3*c*) is filled with "0" bits by a gate 216 (FIGURE 3*d*) which is conditioned by the CL-4 timing signal. The CL-4 timing signal is also applied through an "or" gate 220 (FIGURE 3*c*) as the "reset" input to the associative memory control circuit (FIGURE 3*c*). The operation of the associative memory control circuit is described in detail with respect to FIGURE 4 subsequently. The CL-4 timing signal is also applied through an "or" gate 222 (FIGURE 3*c*) to reset an associative memory counter 223.

After the mask and argument registers have been prepared for operation by the CL-4 timing signal, the CL-5 timing signal is applied through an "or" gate 225 (FIGURE 3*c*) to initiate the association operation in the associative memory. During this operation, the associative memory control circuit 167 locates all words in the associative memory 161 which are available (have not been reserved).

The subsequent CL-6 timing signal causes the program identifier to be written into a number of words in the associative memory corresponding to the number of blocks that are to be reserved, as indicated by the data in buffer register 69 (FIGURE 3*a*). The CL-6 timing signal is applied to the "1" input of an "enter" bistable device 227 (FIGURE 3b) and is applied through an "or" gate 228 to initiate the operation of a clock 229. The clock 229 provides three timing signals, "CL-A," "CL-B" and "CL-C," in addition to an output as the terminal single-shot ("SS-C") returns to its quiescent state of operation (at a time after the CL-C signal is generated). The clock is recycled through an "and" gate 231 and "or" gate 228 to repeatedly generate its outputs during the time that the "and" gate is conditioned by the "1" output of the "enter" bistable device 227 as applied through an "or" gate 233. During the "enter" routine, a "count" input is applied to the associative memory control circuit 167 (FIGURE 3*i*) from the "1" output of the "enter" bistable device 227 (FIGURE 3*b*) through an "or" gate 235. The associative memory control circuit 167 (FIGURE 3*c*) is controlled by the "count" input and the CL-A, CL-B and CL-C timing signals from clock 229 (FIGURE 3*b*) and, in turn, causes the program identifier to be written into words in the associative memory 161 (FIGURE 3*c*). The program identifier is applied to the associative memory from buffer register 64 (FIGURE 3*a*) through a gate 236 (FIGURE 3*d*) which is conditioned by the "1" output of the "enter" bistable device 227 (FIGURE 3*b*). As the program identifier is written into the associative memory during the "enter" routine, the associative memory control circuit 167 generates "count" pulses to an associative memory counter 223 which sums these pulses. The counter output is applied to the comparison circuit 137 (FIGURE 3*b*) during the "enter" routine by a gate 237 which is conditioned by the "1" output of the "enter" bistable device 227. The "1" output of the "enter" bistable device 227 is also applied through the "or" gate 139 to condition gate 141 which passes information from the buffer register 69 (FIGURE 3*a*) to the other input of the comparison circuit 137 (FIGURE 3b). When the program identifier has been written into a sufficient number of words in the associative memory (corresponding to the number of blocks required by the program), the number in the associative memory counter equals the number in the buffer register 69 (FIGURE 3*a*) and the comparison circuit 137 (FIGURE 3*b*) provides an output on lead 149 to condition an "and" gate 241. At the termination of the "enter" routine, the CL-B timing signal from clock 229 is passed through an "and" gate 243 (which is conditioned by the "1" output of the "enter" bistable device 227) and "and" gate 241 to the "0" input of the "enter" bistable device 227. During the "enter" routine the "1" output of the "enter" bistable device 227 conditions an "and" gate 239 to pass the CL-A timing signals as the "countdown" input to the tally counter 145 to decrement its count to reflect the reduced number of unreserved blocks of main memory. The output of the "and" gate 241 (at the termination of the "enter" routine) is also applied as the "entry completed" signal on the lead 77 (FIGURE 3*a*) to the corresponding processor. This signal is also applied to an "or" gate 245 (FIGURE 3*g*) to initiate the operation of the SS-7 single-shot 247 which controls the access request circuit.

(f) *Access request* (*CL-7, CL-8*)

As shown functionally in FIGURE 2 the access request circuit is initiated when the reservation request circuit 21 indicates that no reservation is requested, when the space available circuit 25 indicates that no space is available, or when an "enter" routine is terminated. This is shown in detail in FIGURE 3*g* by signals applied to "or" gate 245 from the output of an "and" gate 125-1 (when no reservation request is signalled as indicated by a "1" output from the "reservation control" bistable device 117), from the output from an "and" gate 249 when insufficient space is available in the main memory (as indicated by a "0" output from the "space available" bistable device 157), and from the output of "and" gate 241 (FIGURE 3*b*) when an "enter" routine has terminated. The "or" gate 245 provides a signal to initiate the operation of the SS-7 bistable device 247. The CL-7 timing signal again resets the "processor selector" bistable device 105-1, 105-2 and 105-3 (FIGURE 3*f*) through "or" gate 107 and resets an "access control" bistable device 251 (FIGURE 3*h*). When the SS-7 single-shot 247 returns to its quiescent state of operation it provides a signal to initiate the operation of the SS-8 single-shot 253 which, in turn, generates the CL-8 timing signal. This signal is applied to condition "and" gates 255-3-1 and 255-3-0 (FIG. 3*f*). In the preferred embodiment of the invention processor 3 is given priority over processors 1 and 2, and processor 2 is given priority over processor 1. When processor 3 is signalling for an access request, bistable device 73-3 (FIGURE 3*f*) is set to provide a "1" output which conditions "and" gate 255-3-1 to pass the CL-8 timing signal through "or" gate 123-3 to set "processor selector" bistable device 105-3. The "1" output of this bistable device provides a signal to condition gates 118-3 (FIGURE 3*a*) to pass information to and from processor 3 and the memory system. When processor 3 is not signalling for an access request, bistable device 73-3 (FIGURE 3*f*) provides a "0" output which conditions "and" gate 255-3-0 to pass the CL-8 timing signal to "and" gates 255-2-1 and 255-2-0. In a similar manner when processor 2 is signalling for an access request the "1" signal from the bistable device 73-2 conditions "and" gate 255-2-1 to pass a signal through "or" gate 123-2 to the "1" input of the "processor selector" bistable device 105-2. The "1" output of this device conditions gates 118–2 (FIGURE 3*a*) which pass information to and from processor 2 and the memory system. When neither processor 3 nor processor 2 is signalling for an access request, the "0" output of bistable device 73–2 (FIGURE 3*f*) conditions "and" gate 255–2–0 which passes a signal to "and" gates 255–1–1 and 255–1–0. When processor 1 is signalling for an access request (while neither processor 3 nor processor 2 is signalling for an access request) bistable device 73–1 (FIGURE 3*f*) provides a "1" output to condition "and" gate 255–1–1 which passes a signal through "or" gate 123–1 to the "1" input of the "processor selector" bistable device 105–1. The "1" of this bistable device is applied to condition gates 118–1 (FIGURE 3*a*) to couple processor 1 to the memory system. When no processor signals for access request, signal is passed by "and" gate 255–1–0 (FIGURE 3*f*) to the "1" input of the access control bistable device 251 (FIGURE 3*h*). In this case, the "1" output of this bistable device conditions an "and" gate 257. When the SS–8 single-shot 253 returns to its quiescent state of operation, a signal is applied to "and" gate 257 which, when no access request is signalled, is passed to "or" gate 101 to recycle the operation of the memory system.

(g) *Directory search for pseudo-address and type of request* (*CL–9*) *through CL–13*

As shown functionally in FIGURE 2, when memory access is requested, the directory is searched by a circuit 33 for a pseudo-address (label) corresponding to the address requested by the program. This is shown in detail in FIGURE 3 and is initiated by the signal from the SS–8 single-shot 253 when it returns to its quiescent state of operation. This signal is applied through an "and" gate 259 (which is conditioned by the "0" output of the "access control" bistable device 251) to initiate the operation of the SS–9 single-shot 261.

The CL–9 timing signal is used to prepare the mask and argument registers for a subsequent association operation on all fields except the "write" field. The mask register thus has "1" signals applied to all positions except the "write" field, to which is applied a "0." This is accomplished by the application of the CL–9 timing signal through "or" gates 200 and 208 (FIGURE 3*i*) to gates 202 and 210 (FIGURE 3*d*) respectively. Gate 202 passes "1" bits to the "program identifier" field of the mask register 163 (FIGURE 3*c*) and gate 210 passes a "0" bit to the "write field" of the mask register. The CL–9 timing signal also conditions gates 263 and 265 (FIGURE 3*d*) to pass "1" bits to the "label" and "pseudo prefix" fields of the mask register. The pseudo-prefix in buffer register 67 (FIGURE 3*a*) is applied to "and" gate 267 (FIGURE 3*d*) and, upon the application of the CL–9 timing signal, is passed to the pseudo-prefix field of the argument register 165 (FIGURE 3*c*). The CL–9 timing signal is also applied through an "or" gate 269 (FIGURE 3*d*) to condition "and" gate 271 which passes the program identifier from the buffer register 64 (FIGURE 3*a*) to the "program identifier" field of the argument register 165 (FIGURE 3*c*). The CL–9 timing signal is also applied to a gate 273 (FIGURE 3*d*) to cause a "1" bit to be applied to the "label" field of the argument register. Thus, the argument register is prepared for an association operation on the program identifier, pseudo-prefix and label fields. The CL–9 timing signal is also applied through "or" gate 220 (FIGURE 3*c*) to provide the "reset" input to the associative memory control circuit 167 (FIGURE 3*c*) and through "or" gate 222 to reset the associative memory counter 223. As the SS–9 single-shot 261 (FIGURE 3*h*) returns to its quiescent state of operation, a signal is applied to the SS–10 single-shot 275 which promptly generates the CL–10 signal.

The CL–10 timing signal is applied through "or" gate 225 (FIGURE 3*c*) to initiate the association operation in the directory memory. As shown functionally in FIGURE 2, the directory is to be searched to provide an indication of the number of words in the directory memory which match the program identifier and pseudo-address generated by the program which is requesting access to the memory. An association is also made on the "label" field as an error-detecting feature. If the pseudo-prefix has been written into the associative memory in a "label" routine, the "label" field should contain a "1" bit if no error has occurred. The directory memory records the matches which are obtained during the association operation. The number of matches is counted by the associative memory counter in the next step (CL–11).

When the SS–10 single-shot 275 returns to its quiescent state of operation, it provides a signal to initiate the operation of the SS–11 single-shot 277 which promptly generates the CL–11 timing signal.

Figure 3I:
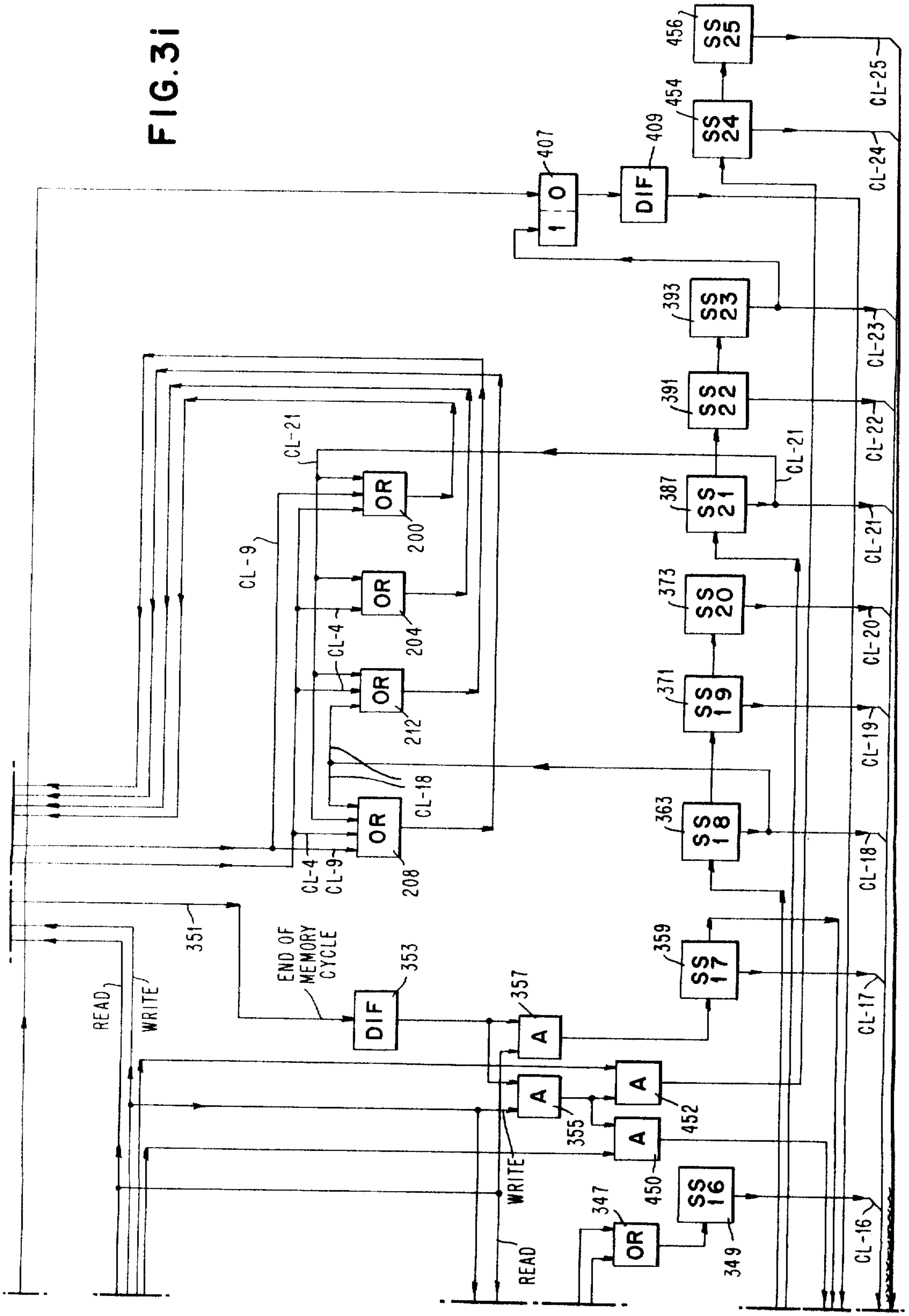

The CL–11 timing signal initiates the operation of the circuitry which counts the number of matches recorded by the associative memory control circuit 167 during the prior association operation. This timing signal is applied to set a "memory access" bistable device 279 (FIGURE 3*b*) and is applied through "or" gate 228 to initiate the operation of clock 229 which supplies the CL–A, CL–B and CL–C timing signals to the associative memory control circuit 167 (FIGURE 3*c*). The "1" output of bistable device 279 is applied through "or" gate 233 to condition "and" gate 231 to permit the clock 229 to recycle. This signal from the bistable device is also applied through "or" gate 235 as the "count" input to the associative memory control circuit 167 (FIGURE 3*c*). If there are any words in the associative memory which matched the argument in the prior association operation, a "count" pulse is supplied to the associative memory counter 223 for each word which matched. Each match requires one cycle of clock 229. At the termination of the counting operation, and "end of search" signal is applied from the associative memory control circuit 167 (FIGURE 3*c*) to the "0" input of the "memory access" bistable device 279 (FIGURE 3*b*). The CL–11 signal is also applied to gate 285 (FIGURE 3*e*) which passes the suffix in buffer register 65 (FIGURE 3*a*) to a memory address register 287 (FIGURE 3*e*). This step prefaces the main memory for the subsequent "access" routine ("read" or "write"). The CL–11 timing signal is also used to read the true prefix in the read-only memory portion of the selected word in the associative memory. The CL–11 timing signal is also used to read the status of the "write" bit of the selected word in the associative memory for subsequent use in determining if the address is protected. The "write" bit is applied to a flip-flop 281 (FIGURE 3*h*). A bistable device 287 (FIGURE 3*h*) is set to its "1" state by the CL–11 timing signal and is returned to its "0" state by the "end of search" signal from the associative memory control circuit 167 (FIGURE 3*i*). The "0" output of this bistable device is applied to a differentiator 289 which generates a signal when the bistable device goes from its "1" state to its "0" state to initiate the operation of the SS–12 single-shot 291.

The CL–12 timing signal controls the circuitry which examines the number in the associative memory counter 223 corresponding to the number of matches in the recent directory search and determines if there is a multiple response or no response coupled with a read request. As shown functionally in FIGURE 2 these conditions represent errors and provide signals to a trap circuit 35. In the preferred embodiment the signal in the trap circuit indicates an error to the operator. When a supervisory program were used in conjunction with this memory system, the error indication would be used to initiate program routine to correct the error. The number of matches from the recent directory search is applied from the associative memory counter 223 (FIGURE 3*c*) to a decoder 293 (FIGURE 3*b*) which provides an output on lead 295 if the number in the counter is "0" (indicating no matches), and a signal on the lead 297 if the number in the counter is "1" (indicating a single match). The decoder is described in detail with respect to FIGURE 9. If a multiple response has occurred, no signal is present on either lead 295 or lead 297 and this condition provides an output on a lead 299 due to the operation of two inverters 301 and 303 and an "and" gate 305. When no signal is applied to either inverter, both inverters provide outputs which are passed by "and" gate 305 on lead 299. The "no response" lead 295 is applied to an "and" gate 306 which is conditioned by the "write" signal from the "0" output of the buffer register 63 (FIGURE 3*a*). The output of "and" gate 306 is applied to condition an "and" gate 307 (FIGURE 3*h*) and through an inverter 308 to an "and" gate 310. When the CL–13 timing signal is also applied to "and" gates 307 and 310, a signal will be passed to control the status of a bistable device 319 such that it will provide a signal at its "1" output for the condition that the directory search indicated no response and a "write" memory access request is present. As described below, this condition initiates the "label" routine. The "no response" output of the decoder 293 (FIGURE 3*c*) is also applied to an "and" gate 309 which is conditioned by the "read" signal from the "1" output of the buffer register 63 (FIGURE 3*a*). As described above, this condition represents one type of error. The signal from "and" gate 309 and the "multiple-response" signal from "and" gate 305 (representing another type of error) are applied through an "or" gate 311 to an "and" gate 313 (FIGURE 3*h*) and, through an inverter 315 to an "and" gate 317. A signal is applied to the "1" input of the "trap control" bistable device 109 by "and" gate 313 when conditioned by the CL–12 timing signal if either error condition is present. When the error conditions are not present, "and" gate 317 supplies a signal to the "0" input of bistable device 109 at the occurrence of the CL–12 timing signal. Thus, bistable device 109 provides a signal at its "1" output to the trap circuit 25 when an error is present. The "0" output of the "trap control" bistable device 109 conditions an "and" gate 321 which passes a signal when the SS–12 single-shot 291 returns to its quiescent state of operation. This signal initiates the operation of the SS–13 single-shot 323. As described above, the occurrence of the CL–13 timing signal establishes the status of bistable device 319 which provides a "1" output when a "label" routine is required. The "label" routine is described in detail subsequently. The "0" output of bistable device 319 conditions an "and" gate 327 when a "label" routine is not required, and the signal from the SS–13 single-shot 323 which is generated as it returns to its quiescent state of operation is passed by this "and" gate to initiate the operation of the SS–14 single-shot 329.

(h) *Address protected* (*CL–14*)

As shown functionally in FIGURE 2, when a single response is indicated by the association operation and a "write" memory access request is signalled, a circuit 39 ascertains whether the address is protected. In this case an error is indicated by a signal to the trap circuit 35. If the address is not protected, a "write" routine 41 is initiated. This is shown in detail in FIGURE 3 where a protected address is indicated by a "0" write bit (as a result of the "protect" routine to be described in detail subsequently) in the associative memory 161 (FIGURE 3*c*). This bit has been shown to control the status of the bistable device 281 (FIGURE 3*h*). In the event that the address is protected, a signal is provided at the "0" output of this bistable device to condition an "and" gate 331. The second input to this "and" gate is applied from the "write" output of the buffer register 63 (FIGURE 3*a*) when a "write" access is requested. In this case, "and" gate 331 (FIGURE 3*h*) provides a conditioning signal to "and" gate 333 which, in turn, passes the CL–14 timing signal to the "1" input of the "trap control" bistable device 111. The "1" output from this bistable device is applied to the trap circuit 25 to indicate an error in the operation of the system. When the address is not protected, the "1" output of bistable device 281 conditions an "and" gate 335 which, passes the "write" output of buffer register 63 (FIGURE 3*a*) as a conditioning signal to an "and" gate 337 (FIGURE 3*h*). This gate then applies the CL–14 timing signal through an "or" gate 115 to the "0" output to the "trap control" bistable device 111 indicating no error conditions. Since this bistable device is also reset to "0" by the CL–0 timing signal, it provides a "1" output only when a "write" memory access is coupled with a "0" write indication from the associative memory (indicating a protected address).

(i) *Write routine* (*CL–15, CL–16*)

As shown functionally in FIGURE 2, when a "write" memory access is signalled, and the address is not protected, a "write" routine 41 is initiated. This operation is initiated by CL–15 timing signal which is generated by the SS–15 single-shot 339 when it is triggered by a signal from an "and" gate 341 which occurs when the SS–14 single-shot 329 returns to its quiescent state of operation, indicating a signal is present from the "trap control" bistable device (indicating no error), and a "write" output is provided by buffer register 63 (FIG. 3*a*). The CL–15 timing signal initiates the "write" routine by conditioning a gate 343 (FIGURE 3*e*) which passes the information to be stored in the main memory from buffer register 69 (FIGURE 3*a*) to the memory data register 345 (FIGURE 3*e*). As the SS–15 single-shot returns to its quiescent state of operation, a signal is applied through an "or" gate 347 to initiate the operation of the SS–16 single-shot 349 which, in turn, generates the CL–16 timing signal. This timing signal is applied to the main memory 3 (FIGURE 3*e*) to execute a memory access cycle. The main memory is conventional in operation and upon the application of the CL–16 timing pulse and a signal on the "write" input from the "0" output of the memory access buffer register 63 causes the information in the memory data register 345 to be stored in the main memory at the location specified by the memory address register 287. (Information was previously applied to the memory address register as described above.) The main memory generates an "end of memory cycle" signal on a lead 351 which is applied to a differentiator 353 (FIGURE 3*i*). The differentiator provides an output pulse which is applied to an "and" gate 355. This "and" gate is conditioned by the signal from the "write" output of the buffer register 63. The output of "and" gate 355 is applied to two "and" gates 450 and 452. When the information that has been written into the corresponding block of the main memory is to be protected, "and" gate 452 is conditioned by the "protect" signal from buffer register 66 (FIGURE 3*a*) and passes a signal to the SS–24 single-shot 454 (FIGURE 3*i*) to initiate the "protect" routine as described in detail subsequently. When the information is not to be protected, the "unprotected" signal from buffer register 66 (FIGURE 3*a*) conditions "and" gate 450 (FIGURE 3*i*) which provides a signal to "or" gate 101 FIGURE 3*g*) to recycle the system. This signal is also applied through an "or" gate 464 as the "access completed" signal 80 (FIGURE 3*a*) to the controlling processor. When the information is to be protected, the "access completed" signal is not generated until the termination of the "protect" routine, as described in detail subsequently.

(j) *Read routine* (*CL–16, CL–17*)

As shown functionally in FIGURE 2, when the directory search indicates a single response and a read request is signalled, a "read" routine 43 is initiated. When the CL–16 timing signal is applied to the main memory 3 (FIGURE 3*e*) and a signal is present on the "read" input from the "read" output of the buffer register 63 (FIGURE 3*a*), the information stored in the main memory at the address specified by the memory address register 287 (FIGURE 3*e*) is transferred to the memory data register 345. During a read routine, the CL–16 timing signal is generated by the SS–16 single-shot 349 when a signal is applied through an "or" gate 347 from an "and" gate 358. This "and" gate is conditioned by the "0" output of the "trap control" bistable device 111 and a signal from the "read" output of buffer register 63 (FIGURE 3*a*). When "and" gate 358 (FIGURE 3*h*) is conditioned, it passes the signal generated by the SS–14 single-shot 329 as it returns to its quiescent state of operation. Thus, the CL–16 timing signal occurs immediately after the CL–14 timing signal when a read request is signalled. The "end of memory cycle" signal which is provided by the main memory 3 (FIGURE 3*e*) on lead 351 to the differentiator 353 (FIGURE 3*i*) is applied to an "and" gate 357. The "and" gate is conditioned when a "read" signal is applied from the buffer register 63 (FIGURE 3*a*). The output of "and" gate 357 initiates the operation of the SS–17 single-shot 359 which, in turn, generates the CL–17 timing signal. This timing signal is applied to a gate 361 (FIGURE 3*e*) which passes the information in the memory data register 345 to buffer register 75 (FIGURE 3*a*) and, eventually to the processor whose program controlled the memory access. At the termination of the "read" routine, as the SS–17 single-shot returns to its quiescent state of operation, it provides a signal to "or" gate 101 (FIGURE 3*g*) to recycle the system. This signal is also applied through "or" gate 464 as the "access completed" signal 80 (FIGURE 3*a*) to the controlling processor.

(k) *Label routine* (*CL–18, CL–19, CL–20*)

As shown functionally in FIGURE 2, when the directory search indicates no response and a "write" access is signalled, a "label" routine 47 is initiated. This is the usual situation that occurs when information is applied to the memory system by a program with a pseudo-address that has not been previously used. The "label" routine is initiated by the signal from "and" gate 325 (FIGURE 3*h*) which is applied to the SS–18 single-shot 363. As described above, "and" gate 325 generates an output as the SS–13 single-shot 323 returns to its quiescent state of operation if the directory search indicates no response (a signal on lead 295 (FIGURE 3*b*) to "and" gate 306) and a "write" access is requested (providing the second input to "and" gate 306). The CL–18 timing signal is used to prepare the associative memory for an association operation on the "program identifier" and "label" fields. This timing signal is applied to "and" gate 365 (FIGURE 3*d*) to cause a "0" bit to be placed in the "label" field of the argument register 165 (FIGURE 3*c*). The argument register already contains the program identifier from the previous association (CL–9). The CL–17 timing signal is also applied to "or" gates 212 and 218 (FIGURE 3*i*) which supply signals to gates 214 and 210 (FIGURE 3*d*) to cause "0" bits to be applied to the "pseudo prefix" and "write" fields of the mask register 163 (FIGURE 3*c*). The "program identifier" and "label" fields of the mask register contain "1" bits from an earlier operation (CL–9). When the SS–18 single-shot 363 returns to its quiescent state of operation, a signal is applied to initiate the operation of the SS–19 single-shot 371 which promptly generates the CL–19 timing signal. The CL–19 timing signal is applied through "or" gate 225 (FIGURE 3*c*) to initiate an association operation on the "program identifier" and "label" field of the associative memory which causes the associative memory control circuit 167 to locate all unlabelled words that are reserved for the corresponding program. When the SS–19 single-shot 371 returns to its quiescent state of operation, a signal is applied to initiate the operation of the SS–20 single-shot 373, which, in turn, generates the CL–20 timing pulse. This timing signal is applied as the "1" input a "label" bistable device 375 (FIGURE 3*b*) which provides a signal at its "1" output which is applied to gate 377 (FIGURE 3*d*). This gate passes the pseudo-prefix from buffer register 67 (FIGURE 3*a*) to the "pseudo-prefix" field of the associative memory 161 (FIGURE 3*c*). The "1" output of the "label" bistable device 375 (FIGURE 3*b*) is also applied to gates 379 and 381 (FIGURE 3*d*) which passes "1" bits to the "label" and "write" fields of the associative memory 161 (FIGURE 3*c*). The "1" output of the label bistable device 375 (FIGURE 3*b*) is also applied through an "or" gate 383 (FIGURE 3*d*) as the "write" input of the associative memory control circuit 167 (FIGURE 3*c*). The CL–20 timing signal is also applied to "or" gate 228 to initiate the operation of clock 229 whose output signals are applied to the associative memory control circuit 167 to cause the "pseudo-prefix," "label," and "write" information to be stored in the proper rows of the associative memory. Since only one word is labelled during a "label" routine, clock 229 is not recycled. As the SS–C single-shot returns to its quiescent state of operation, a signal is provided to the "0" input of the "label" bistable device 375. The resulting signal at the "0" output of this bistable device is applied through an "or" gate 384 to a differentiator 385 (FIGURE 3*g*) which provides a signal to "or" gate 101 to recycle the system.

(l) *Exit routine* (*CL–21, CL–22, CL–23*)

As shown functionally in FIGURE 2, an "exit" type of reservation request initiates the operation of an "exit" routine 31. During this routine, all words in the associative memory which have program identifiers that correspond to the program requesting an "exit" are replaced with "0" bits. This is shown in detail in FIGURE 3 where the operation of the SS–21 single-shot 387 (FIGURE 3*i*) is initiated by the signal from the "and" gate 133–0 (FIGURE 3*g*) (which occurs when an exit request is signalled as the SS–2 single-shot 127 returns to its quiescent state of operation). The CL–21 timing signal prepares the associative memory for an association operation on the "program identifier" field. This timing signal is passed by "or" gate 269 (FIGURE 3*d*) to condition gate 271 which, in turn, applies the "program identifier" to the argument register 165 (FIGURE 3*c*). The CL–21 timing signal is applied through "or" gate 200 (FIGURE 3*i*) to condition gate 202 (FIGURE 3*d*) which passes "1" bits to the "program identifier" field of the mask register. The CL–21 timing signal also causes "0" bits to be applied to all other fields of the mask register by conditioning gates 206, 210 and 214 when applied through "or" gates 204, 208 and 212, respectively. The CL–21 timing signal is also applied through "or" gate 220 (FIGURE 3*c*) as the "reset" input to the associative memory control circuit 161. As the SS–21 single-shot 389 returns to its quiescent state of operation, a signal is provided to initiate the operation of the SS–22 single-shot 391 which, in turn, generates the CL–22 timing signal. This signal is applied through "or" gate 225 (FIGURE 3*c*) to cause an association operation to be performed in the directory memory 5. During this operation the "program identifier" field of the words in the associative memory is compared to the "program identifier" from the corresponding processor and the associative memory control circuit stores indications of the words that match. When SS–22 single-shot 391 returns to its queiscent state of operation, a signal is provided to initiate the operation of SS–23 single-shot 393 which, in turn, generates the CL–23 timing signal. This timing signal is appled to "or" gate 228 (FIGURE 3*b*) to initiate the operation of clock 229. The CL–23 timing signal is also applied to the "1" input of the "exit" bistable device 395 (FIGURE 3*b*). The signal that is generated at the "1" output of this bistable device is applied through "or" gate 233 to condition "and" gate 231 to permit clock 229 to recycle. This output of the "exit" bistable device also causes "0" bits to be written at every field (except the "true prefix" field) of each word in the associative memory having a "program identifier" that corresponds to the "program identifier" of the connected processor. This is accomplished by conditioning gates 399, 401, 403 (through an "or" gate 462) and 405 (FIGURE 3*d*) which cause "0" bits to be applied to the "program identifier," "label," "write" and "pseudo prefix" fields of the associative memory. The signal at the "1" output of the "exit" bistable 395 is also applied to condition an "and" gate 397 to provide "count-up" signals to the tally counter 145. As each word in the associative memory is replaced with "0" bits, the tally counter 145 is incremented to reflect the additional unreserved main memory space. When this operation is terminated, the "end of search" signal from the associative memory control circuit 167 (FIGURE 3*c*) is applied to the "0" input of the "exit" bistable device 395 (FIGURE 3*b*). At this time, clock 229 stops recycling as "and" gate 231 is no longer conditioned. The CL–23 timing signal is also applied to the "1" input of a bistable device 407 (FIGURE 3*i*). The "end of search" signal from the associative memory control circuit 167 (FIGURE 3*c*) is then applied to the "0" input of this bistable device to provide a signal at its "0" output. This signal is differentiated by a circuit 409 to provide a signal to "or" gate 101 (FIGURE 3*g*) to recycle the operation of the system. This signal is also applied as the "exit completed" signal on lead 79 to the connected processor.

(m) *Protect routine* (*CL–24, CL–25*)

As shown functionally in FIGURE 2, the information stored in the main memory may be protected from subsequent alteration by a "protect" routine. This is especially advantageous if several processors are controlled by a common program or the probability or programming errors is considerable. When stored information is to be protected, a signal is applied from the processor to buffer register 66 (FIGURE 3*a*) at the same time that the last information to be stored in the block of memory is presented. At all other times, a signal indicating that information is not to be protected is supplied by the processor. As described above, after a "write" routine, when information is to be protected, "and" gate 452 (FIGURE 3*i*) supplies a signal to initiate the operation of the SS–24 single-shot 454. The mask and argument registers contain the necessary data (supplied at CL–9) for an association operation on the "program identifier," pseudo-address" and "label" fields. The CL–24 timing signal is applied through "or" gate 225 (FIGURE 3*c*) to initiate an association operation wherein the associative memory control circuit 161 locates the desired word. The SS–24 single-shot 454 (FIGURE 3*i*) then provides the required signal to the SS–25 single-shot 456 which generates the CL–25 timing signal. This signal is applied to the "1" input of a "protect" bistable device 458 (FIGURE 3*b*) which provides, at its "1" output, a signal which is passed by "or" gate 462 (FIGURE 3*d*) to condition gate 403. This gate causes a "0" bit to be written into the "write" field of the selected word in the associative memory. The "1" output of the "protect" bistable device 458 (FIGURE 3*b*) is also applied through "or" gate 228 to initiate the operation of clock 229. This clock operates for only one cycle during the "protect" routine because only one word in the associative memory is affected. The "1" output of the "protect" bistable device is also applied through "or" gate 383 as the "write" input to the associative memory control circuit 161 (FIGURE 3*c*). The outputs of clock 229 (FIGURE 3*b*) to the associative memory control circuit 161 (FIGURE 3*d*) control the writing of the protect bit ("0") in the selected word in the associative memory. The CL–C timing signal is also applied to the "0" input of the "protect" bistable device 458 (FIGURE 3*b*) to produce a signal at its "0" output which is applied through an "or" gate 384 to a differentiator 385 (FIGURE 3*g*). The output pulse produced by this circuit is applied to "or" gate 101 to recycle the system. The signal at the "0" output of the "protect" bistable device 458 (FIGURE 3*b*) is also applied to a differentiator circuit 386 which provide a pulse through "or" gate 464 (FIGURE 3*g*) as the "access completed" signal 80 (FIGURE 3*a*) to the controlling processor.

(n) *Directory memory*

The directory memory 5 is shown in detail in FIGURE 4. The directory contains a 256 word associative memory 161 and an associative memory control circuit 167. Each word in the associative memory contains 14 bits of read-write binary storage 601 and 8 bits of read-only binary storage 603. Information to be stored in the read-write portion of the associative memory is applied on leads 608 and information is retrievable from all storage elements on leads 619. The read-write portion of the memory can be compared to information in an argument register comprising 14 bits of binary storage 605. The mask register comprises 14 bits of binary data storage 607 which controls the columns in which the comparison (association) is accomplished.

The binary storage elements 601 are shown in detail in FIGURE 5. Information that is applied on "write" (input) leads 608 is stored in a bistable device 609 when a signal is applied on a "write select" lead 611. This signal conditions "and" gates 613 which pass the information on leads 608 to the input of the bistable device 609. The information in the bistable device is retrieved when a signal is present on a "read select" lead 615 to condition "and" gates 617 to pass the contents of the bistable device 609 to the read (output) leads 619. In addition, information may be applied on "associate" input leads 621 for comparison with the information stored in the bistable device 609. Two "and" gates 623 are connected to provide an output on "mismatch" lead 625 when the information applied on the associate leads 621 is different from the information stored in the bistable device 609.

A mask register storage element 607 is shown in detail in FIGURE 6. Control signals are applied on leads 627 to establish the condition of a bistable device 629. Two "and" gates 631 pass the information applied on input leads 633 to output leads 621 when, and only when, the bistable device 629 provides a "1" output.

An element of the argument register is shown in detail in FIGURE 7. Information is applied on leads 637 to establish the condition of a bistable device 639 which supplies conditioning signals to "and" gates 641. When a signal is applied to an "associate" input lead 643 the information stored in the bistable device is applied to output leads 633.

A read-only storage element 603 of the associate memory is shown in detail in FIGURE 8. Although any means of applying a read-out data is suitable for use, a switch 647 is shown to condition one of two "and" gates 649. When a "read select" signal is applied on a lead 615 the conditioned "and" gate passes a signal representative of the position of the switch to output leads 651.

The circuits that are shown in detail in FIGURES 5–8 are assembled as shown in FIGURE 4 to provide a directory memory where information is applied to the read-write portion of the memory on leads 608 and information is retrieved on output leads 619. Information is applied to the argument register on leads 637 and the mask register is prepared by data applied on leads 627. When a signal is applied on the associate input lead 643, the data in the argument register at those bit positions corresponding to "1" bits in the mask register are applied to the read-only portion of the associate memory on leads 621. This data operates in conjunction with the control signals applied from the associative memory control circuit 167 on leads 611 (write select) and 615 (read select). The associative memory applies a feedback control signal on a lead 625 (mismatch) to the associative memory control circuit 167.

Several inputs are applied to the associative memory control circuit 167: CL–A, CL–B and CL–C timing signals on leads 671, 673 and 675, respectively, a reset signals on lead 677, a count signal on lead 679, a write signal on lead 681 and a read signal on lead 683. A signal is first applied on reset lead 677 to the "1" inputs of a group of "match indicators" bistable device 685, and these circuits provide signals at their "1" outputs. Regardless of the operation to be performed by the associative memory, a comparison is first made between information in the argument register and the information in the read-write memory in the columns that are selected by the mask register when a signal is applied on the associative lead 643. The match indicators 685 in the control circuit 161 are then returned to their "0" states when the corresponding words in the associate memory do not match the masked argument. The operation is accomplished by the "mismatch" signal which is applied through "or" gate 701. After the status of the match indicators 685 is established to record the associate memory words which match the masked arguments, the CL–A, CL–B and CL–C timing signals are sequentially applied along with at least one of the "count," "write" and "read" signals. The match indicator-1 bistable device 685, when reset, conditions "and" gate 687 and inhibits "and" gate 689, whereby the CL–A timing signal is applied to the "1" input of a "control-1" bistable device 691. The output of "and" gate 687 also conditions "and" gates 693, 695 and 697 in the corresponding channel. The "count" signal is applied on lead 679 to "and" gate 693 if the number of matches is to be totalled and "and" gate 693 passes the CL–A timing signal on an output lead 699; the "write" signal is applied on input lead 681 when information is to be written into the read-write portion of the associative memory and "and" gate 695 passes the CL–A timing signal as the "write select" signal on lead 611; and when a read signal is applied, "and" gate 697 passes the CL–A timing signal as the "read select" signal on lead 615. The CL–B timing signal is applied to "and" gate 703 which passes a signal through "or" gate 701 to the "0" input of the "match indicator-1" bistable device 685. The output of this bistable device conditions "and" gate 689 such that a subsequent CL–A timing signal, if applied, operates on the second channel in the same manner that is described above. The CL–C timing signal then resets the "control-1" bistable device 691. The associative memory control circuit automatically selects the first word in the associative memory that matches the argument in the masked columns as when words do not match the "mismatch" signal is applied to the "0" input of the corresponding "match indicator" bistable device 685 to cause the CL–A timing signal to bypass words that do not match through "and" gates 689 until the first matching word is located.

In some applications, the CL–A, CL–B and CL–C timing signals are applied once to operate on the first matching word in the associative memory. For example, in the "label" and "protect" routines, only one word in the associative memory corresponding to one block of main memory storage is affected. In other applications, the CL–A, CL–B and CL–C timing signals are applied one or more times. For example, in the "enter" and "exit" routines many associative memory words, corresponding to many main memory blocks, can be affected. In this case, the timing signals are recycled until an "end of search" signal is applied on lead 705 (FIGURE 4*a*) indicating that the status of all match indicators have been sampled. During the "memory access" routine, the number of matches is counted (as described in detail above), so this routine also requires recycling timing signals.

(o) *Decoder*

The decoder 293 that was described with respect to FIGURE 3*b* is shown in detail in FIGURE 9. An eight-bit word ($2^0, 2^1 \ldots 2^7$) is applied to this circuit which provides an output on lead 295 when the word equals "00000000" and on lead 297 when the word equals "00000001." This is accomplished in the first case by the application of the signals on all of the "0" input leads to an "and" gate 801 and in the second case, by the application of the signal on the "1" input lead labelled "$2^1$" and the signals on all other "0" input leads to an "and" gate 802.

(p) *Comparison circuit*

The comparison circuit 137 that was described with respect to FIGURE 3*b* is shown in detail in FIGURE 10. Two eight-bit words ($2^0, 2^1 \ldots 2^7$) are applied as the minuend and subtrahend of a subtractor 803 which produces an eight-bit difference and a sign bit. A detailed discussion of a subtractor that is suitable for use in the comparison circuit is shown and described with respect to FIGURE 21 of a U.S. patent application, Ser. No. 45,034, filed on July 25, 1960, by Lawrence P. Horwitz and Glenmore L. Shelton, Jr. The subtractor indicates the difference in the conventional binary form when the difference equals zero or is positive and a "0" bit is supplied at the "sign" output. Negative differences are presented in complementary form and a "1" sign bit is provided. The comparison circuit provides a signal in the "M<S" output lead 151 when the minuend is smaller than the subtrahend. Since this situation provides a negative difference, the "1" bit at the "sign" output of the subtractor is applied to lead 151. When the minuend is larger than the subtrahend a signal is applied on the "M<S" output lead 147. An "or" gate 804 passes a signal to an "and" gate 805 when any bit of the difference is inverted by a circuit 806 to condition "and" gate 805 which provides the signal on lead 147. The output of "or" gate 804 is inverted by a circuit 807 to provide a signal on lead 149 when all input signals to the "or" gate contain "0" bits, indicating that the minuend equals the subtrahend.

(q) *Tally counter*

The tally counter 145 that was described with respect to FIGURE 3*b* is shown in detail in FIGURE 11. This circuit generates a nine-bit output word ($2^0, 2^1 \ldots 2^8$) representing the sum of the applied count signals. The counter is incremented by signals that are applied on the "count up" input lead and is decremented by signals that are applied on the "count down" input lead. The tally counter monitors the number of blocks of main memory storage that are available (unreserved) and is originally reset to a count of "100000000" corresponding to the 256 blocks in the main memory. As blocks of memory are reserved by "enter" routines, the tally counter is decremented by count down pulses and as blocks of memory are relased by "exit" routines, the counter is incremented. A "count direction" bistable device 851 provides a "1" output when the counter is to increment its total and a "0" output when the counter is to decrement its total. The outputs of this bistable device controls two groups of "and" gates 853 and 855 which control the coupling between stages 857 of the counter. The "count" up and "count down" input signals are combined in an "or" gate 859 and applied through a delay circuit 861 to the binary (toggle) input of the lowest order ($2^0$) stage of the counter. The delay circuit insures that the "count direction" bistable device 851 is controlled before data is applied to the counting stage 857. As each input count pulse (up or down) is applied, the status of the lowest order stage is reversed. According to well-known principles of arithmetic, when counting upward, a carry signal is applied to reverse the status of the next-higher order stage when the lower-order stage switches status from a "1" to a "0." Conversely, when counting downward the carry signal is generated when the lower-order stages switches status from a "0" to a "1." When counting upward, "and" gates 853 are conditioned by the "1" output of the "count direction" bistable device 851 to pass the "0" output of each stage (except the highest order stage) through an "or" gate 863 and capacitor 865 to the binary (toggle) input of the next-higher order stage. The capacitor passes only the leading edge of the applied signal, so the next-higher order stage is pulsed as the lower order stage switches status from a "1" to a "0." In the same manner, "and" gates 855 pass the "1" output of each stage 857 through "or" gates 863 and capacitors 865 to the trigger input of the next-higher order stage. The output of the tally counter is derived from the stages 857 on nine pairs of output leads.

Thus, a system has been described which permits several programs and processors to share a single main memory where the blocks of main memory are automatically allocated to the various programs as required. In the present invention, the addressing scheme employed in each program is independent of the scheme employed in other programs and a directory memory correlates the pseudo-addresses used in the program with the true main memory addresses. The use of several programs with a single main memory is thus radically simplified because the programs can be independently written and a supervisory program is not required to coordinate main memory allocation.

While the invention has been particularly shown and described with reference to a preferred embodiment thereof, it will be understood by those skilled in the art that various changes in form and details may be made therein without departing from the spirit and scope of the invention.

What is claimed is:

1. An apparatus comprising, in combination:

an addressable main memory for storing information at locations corresponding to a main memory addressing scheme;

a plurality of processors, each having a program identifier and each capable of accessing information stored in the addressable memory according to a pseudo-addressing scheme that is independent of the pseudo-addressing scheme specified by each of the other processors;

and a directory memory for converting the program identifiers, addresses in the independent pseudo-addressing schemes used in the processors into addresses in the main memory addressing scheme.

2. The apparatus described in claim 1, in combination with means for assigning priority to a processor.

3. The apparatus as described in claim 1, in combination with means for protecting predetermined information stored in the main memory to prevent predetermined alterations.

4. The apparatus described in claim 1, in combination with trap means for providing error indications when information is accessed in said memory under predetermined conditions.

5. An apparatus comprising, in combination:

an addressable main memory for storing information at locations corresponding to a main memory addressing scheme;

a plurality of processors, each having a program identifier and each requiring access to main memory locations to store and retrieve information which is labelled by the processor according to a pseudo-addressing scheme that is uniquely established by the program controlling the processor;

and a directory for assigning a main memory address when information from a processor is to be stored, where the directory stores the relationship of assigned main memory addresses to program identifiers, and pseudo-addresses so as to permit the subsequent retrieval of stored data when the program identifiers and pseudo-addresses are specified.

6. The apparatus described in claim 5, in combination with means for assigning priority to a processor.

7. The apparatus described in claim 5, in combination with trap means for providing error indications under predetermined conditions.

8. The apparatus described in claim 5, wherein the directory reserves main memory locations to satisfy prespecified requirements of a program and releases reserved locations when their need has terminated.

9. The apparatus described in claim 5, in combination with means for protecting predetermined information stored in the main memory to prevent predetermined alterations.

10. An apparatus comprising, in combination:

an addressable main memory for storing information at locations corresponding to a main memory addressing scheme;

processing means capable of simultaneous control by a plurality of programs, each requiring access to storage locations in the main memory as specified by independent pseudo-addressing schemes;

and a directory for converting the identification of the programs and addresses in their independent pseudo-addressing schemes into addresses in the main memory addressing scheme.

11. The apparatus described in claim 10 in combination with means for assigning priority to a processor.

12. The apparatus described in claim 10 in combination with means for protecting predetermined information stored in the main memory to prevent predetermined alterations.

13. The apparatus described in claim 10 in combination with trap means for providing error indications when information is accessed in said main memory under predetermined conditions.

14. An apparatus comprising, in combination:

an addressable main memory for storing information at locations corresponding to a main memory addressing scheme;

a plurality of processors controlled by a plurality of programs having program identifiers and each requiring access to main memory locations to store and retrieve information which is labelled by the processor according to a program-originated pseudo-addressing scheme;

and a directory for assigning a main memory address when information from a processor is to be stored, where the directory stores the relationship of assigned main memory addresses to program identifiers, and pseudo-addresses so as to permit retrieval of stored information when the program identifiers and pseudo-addresses are specified.

15. The apparatus described in claim 14, in combination with means for assigning priority to a processor.

16. The apparatus described in claim 14, in combination with trap means for providing error indications when information is accessed in said main memory under predetermined conditions.

17. The apparatus described in claim 14, wherein the directory reserves main memory locations to satisfy prespecified requirements of a program and releases reserved locations when their need has terminated.

18. The apparatus described in claim 14, in combination with means for protecting predetermined information stored in the main memory to prevent predetermined alterations.

19. An apparatus comprising, in combination:

an addressable main memory containing blocks of memory locations, where each location is addressed by a true prefix corresponding to the block containing the location and by a suffix specifying the relative position of the location within the block;

a plurality of processors controlled by a plurality of programs having program identifiers and requiring access to the main memory to store and retrieve information under a pseudo-addressing scheme containing a pseudo-prefix corresponding to a block of pseudo-addresses and a suffix specifying the relative position of the information within the block;

a directory memory comprising a word of storage for each block of the main memory, where each word comprises at least a true prefix field, a pseudo-prefix field, a program identifier field and a write field, where the true prefix field of each word contains information corresponding to a different true prefix;

means for reserving a number of blocks of main memory under the control of the program by storing the program identifier in a corresponding number of previously-unreserved words in the directory memory;

means for labelling a block of main memory under the control of the program by storing a pseudo-address in a word in the directory memory which has been reserved for the controlling program;

means for storing information in the main memory under the control of a program-specified pseudo-prefix and suffix at the main memory location that is determined by the true prefix in the directory memory word containing the specified pseudo-prefix and by the suffix, when this main memory location is not protected as indicated by the information in the write field of the directory memory;

means for protecting stored information to prevent alteration, when the need for protection is indicated by the program, by storing an indication in the write field of the corresponding word in the directory memory;

means for retrieving information to the processor, under the control of a pseudo-prefix and suffix provided by the program and under the control of the program identifier, by supplying to the processor the information that is stored at the main memory address determined by the corresponding true prefix, as determined by the directory memory, and by the suffix;

and means for releasing a reservation under the control of the program by erasing the program identifier stored in words in the directory memory.

20. The apparatus described in claim 19 in combination with means for providing an error indication when the program indicates that information is to be stored at a protected true address.

21. The apparatus described in claim 19 in combination with means for providing an error indication when the program indicates a request for retrieval of information at a location specified by a program identifier and pseudo-address which was not correlated to a true prefix by a previous labelling operation.

22. The apparatus described in claim 19 in combination with means for providing an error indication when a plurality of true prefixes are correlated with a single program identifier and pseudo-prefix.

23. The apparatus described in claim 19 in combination with means for assigning priority to a processor.

24. The apparatus described in claim 19, wherein the directory memory comprises an associative memory.

25. An apparatus comprising, in combination:

an addressable main memory for storing information at locations corresponding to a main memory addressing scheme;

a plurality of processors controlled by a plurality of programs having program identifiers and each requiring access to main memory locations to store and retrieve information which is labelled by the processor according to a pseudo-addressing scheme;

a directory memory comprising a main memory address field, a pseudo-address field and a program identifier field for storing the correlation between main memory addresses, pseudo-addresses and program identifiers, where the true address field of each word contains information corresponding to different true addresses;

means for reserving main memory locations for particular programs by storing the corresponding program identifiers in directory memory words;

means for labelling main memory locations by storing pseudo-addresses in directory memory words which have been reserved for the corresponding controlling programs; and means for storing and retrieving information in the main memory under the control of pseudo-addresses provided by the program and under the control of program identifiers by addressing the main memory by the corresponding true addresses as determined by the directory memory.

26. The apparatus described in claim 25, in combination with means for assigning priority to a processor.

27. The apparatus described in claim 25, in combination with trap means for providing error indications when information is accessed in said main memory under predetermined conditions.

28. The apparatus described in claim 25, in combination with means for protecting predetermined information stored in the main memory to prevent predetermined alterations.

29. The apparatus described in claim 25, wherein the directory memory comprises an associative memory.

30. An apparatus comprising, in combination:

an addressable main memory for storing information at locations corresponding to a main memory addressing scheme;

a plurality of processors controlled by a plurality of programs having program identifiers and each requiring access to main memory locations to store and retrieve information which is labelled by the processor according to a pseudo-addressing scheme;

and a directory for reserving main memory addresses for a program by storing the program identifier, and for storing pseudo-addresses and the relationship of program identifiers and pseudo-addresses to true addresses when information is to be stored in the main memory, to permit subsequent retrieval of stored information when program identifiers and pseudo-addresses are specified.

31. The apparatus described in claim 30, in combination with means for assigning priority to a processor.

32. The apparatus described in claim 30, in combination with trap means for providing error indications when information is accessed in said main memory under predetermined conditions.

33. The apparatus described in claim 30, wherein the directory system releases reserved locations when their need has terminated, under the control of the program.

34. The apparatus described in claim 30, in combination with means for protecting predetermined information stored in the main memory to prevent predetermined alterations.

References Cited by the Examiner

UNITED STATES PATENTS 3,200,380 8/1965 MacDonald et al. ---- 340—172.5

ROBERT C. BAILEY, *Primary Examiner.*

M. LISS, J. P. VANDENBURG, *Assistant Examiners.*